US012321199B2

(12) United States Patent
Park et al.

(10) Patent No.: US 12,321,199 B2
(45) Date of Patent: Jun. 3, 2025

(54) USE METHOD ACCORDING TO FOLDING STATE OF DISPLAY, AND ELECTRONIC APPARATUS USING SAME

(71) Applicant: SAMSUNG ELECTRONICS CO., LTD., Suwon-si (KR)

(72) Inventors: Chunhyoung Park, Suwon-si (KR); Jangwoo Lee, Suwon-si (KR); Seokjin Lim, Suwon-si (KR); Yujin Lim, Suwon-si (KR); Jinhoon Cho, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 141 days.

(21) Appl. No.: 18/088,036

(22) Filed: Dec. 23, 2022

(65) Prior Publication Data

US 2023/0130530 A1  Apr. 27, 2023

Related U.S. Application Data

(63) Continuation of application No. PCT/KR2021/007998, filed on Jun. 25, 2021.

(30) Foreign Application Priority Data

Jun. 26, 2020 (KR) .................. 10-2020-0078730

(51) Int. Cl.
G06F 1/16 (2006.01)
G06F 9/451 (2018.01)

(52) U.S. Cl.
CPC .......... G06F 1/1652 (2013.01); G06F 1/1641 (2013.01); G06F 1/1681 (2013.01); G06F 9/451 (2018.02)

(58) Field of Classification Search
CPC ...... G06F 3/0481; G06F 1/1641; G06F 9/451; G06F 1/1647; G06F 3/14; G06F 1/1681;
(Continued)

(56) References Cited

U.S. PATENT DOCUMENTS 9,009,984 B2  4/2015 Caskey et al.
9,013,368 B1  4/2015 Kim
(Continued)

FOREIGN PATENT DOCUMENTS

KR  10-2013-0056674  5/2013
KR  10-2016-0016521 A  2/2016
(Continued)

OTHER PUBLICATIONS

International Search Report for PCT/KR2021/007998 mailed Sep. 28, 2021, 4 pages.
(Continued)

Primary Examiner — Yaron Cohen
(74) Attorney, Agent, or Firm — Nixon & Vanderhye P.C.

(57) ABSTRACT

An electronic apparatus according to various embodiments of the present disclosure comprises: a first display foldable with respect to at least one axis; a sensor configured to detect the folding state of the first display; and a processor operatively connected to the first display and the sensor, wherein the processor is configured to: detect the folding state of the first display using the sensor; determine the display area of the first display based on the folding state of the first display;
(Continued)

select an operating system (OS) corresponding to the folding state of the first display; and display a user interface (UI) on the display area of the first display, the user interface being generated in the operating system.

16 Claims, 29 Drawing Sheets

(58) Field of Classification Search
CPC .......... G06F 21/31; G06F 3/01; G06F 1/1677; G06F 1/1624; G06F 3/04886; G06F 1/1652; G06F 2203/04803
See application file for complete search history.

(56) References Cited

U.S. PATENT DOCUMENTS

| | | | |
|---|---|---|---|
| 9,891,663 B2 | 2/2018 | Park | |
| 10,504,488 B2 | 12/2019 | Chun et al. | |
| 2013/0342483 A1 | 12/2013 | Seo et al. | |
| 2015/0378557 A1* | 12/2015 | Jeong | G06F 1/1652 715/835 |
| 2016/0034047 A1 | 2/2016 | Lee et al. | |
| 2017/0034320 A1 | 2/2017 | Stewart | |
| 2019/0018454 A1 | 1/2019 | Jung et al. | |
| 2019/0042066 A1 | 2/2019 | Kim et al. | |
| 2020/0310492 A1 | 10/2020 | Kim et al. | |
| 2021/0048854 A1 | 2/2021 | Kang et al. | |
| 2021/0048926 A1 | 2/2021 | Woo et al. | |
| 2021/0089081 A1 | 3/2021 | Ro et al. | |

FOREIGN PATENT DOCUMENTS

| | | |
|---|---|---|
| KR | 10-2017-0049777 | 5/2017 |
| KR | 10-2017-0086321 A | 7/2017 |
| KR | 10-2017-0093658 | 8/2017 |
| KR | 10-2017-0102451 | 9/2017 |
| KR | 10-2018-0020737 | 2/2018 |
| KR | 10-1871716 | 6/2018 |
| KR | 10-2019-0071663 | 6/2019 |
| WO | 2018/034555 | 2/2018 |
| WO | 2019/168299 | 9/2019 |

OTHER PUBLICATIONS

Written Opinion of the ISA for PCT/KR2021/007998 mailed Sep. 28, 2021, 4 pages.
Korean Office Action dated Apr. 11, 2025 for KR Application No. 10-2020-0078730.

* cited by examiner

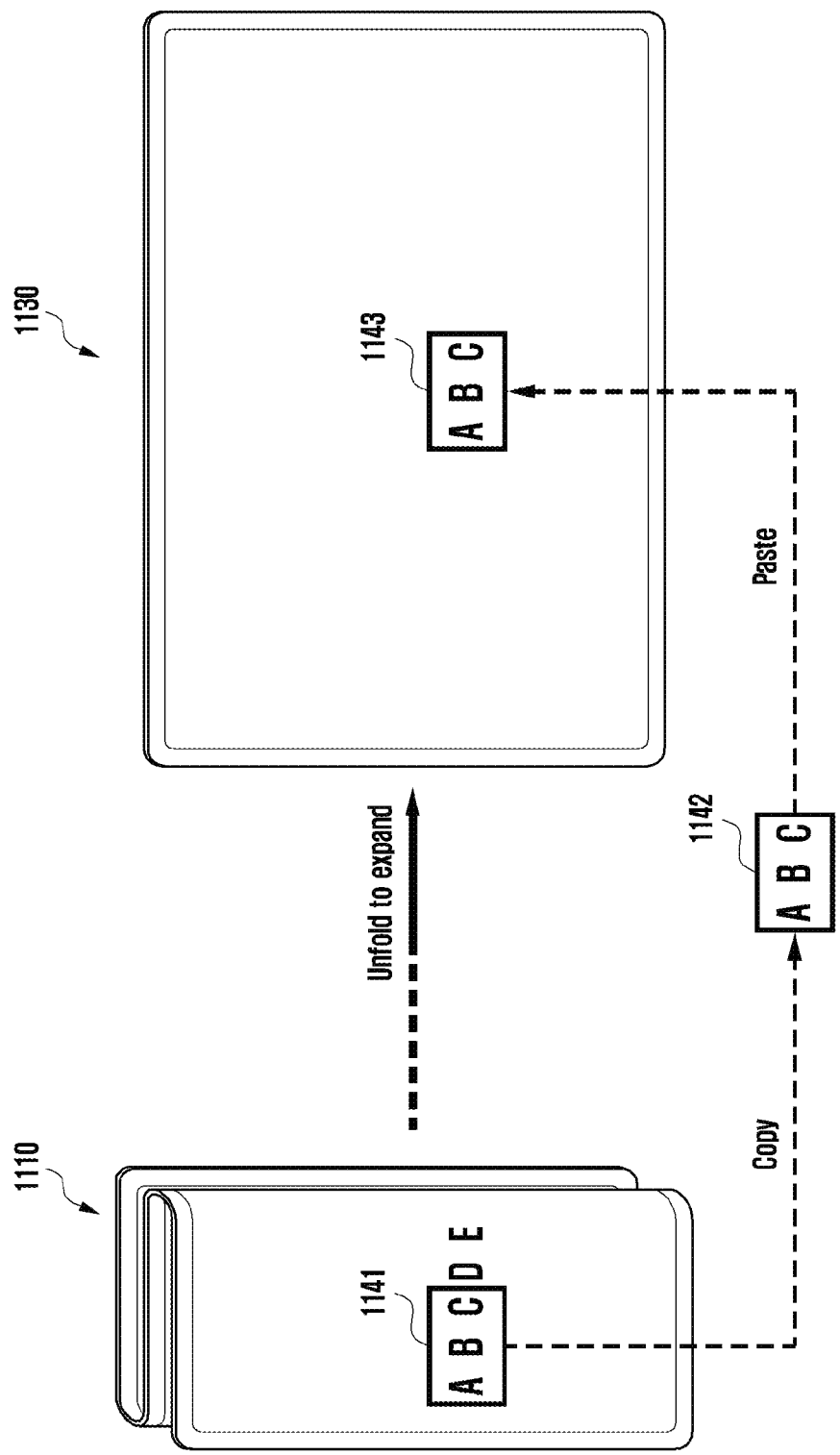

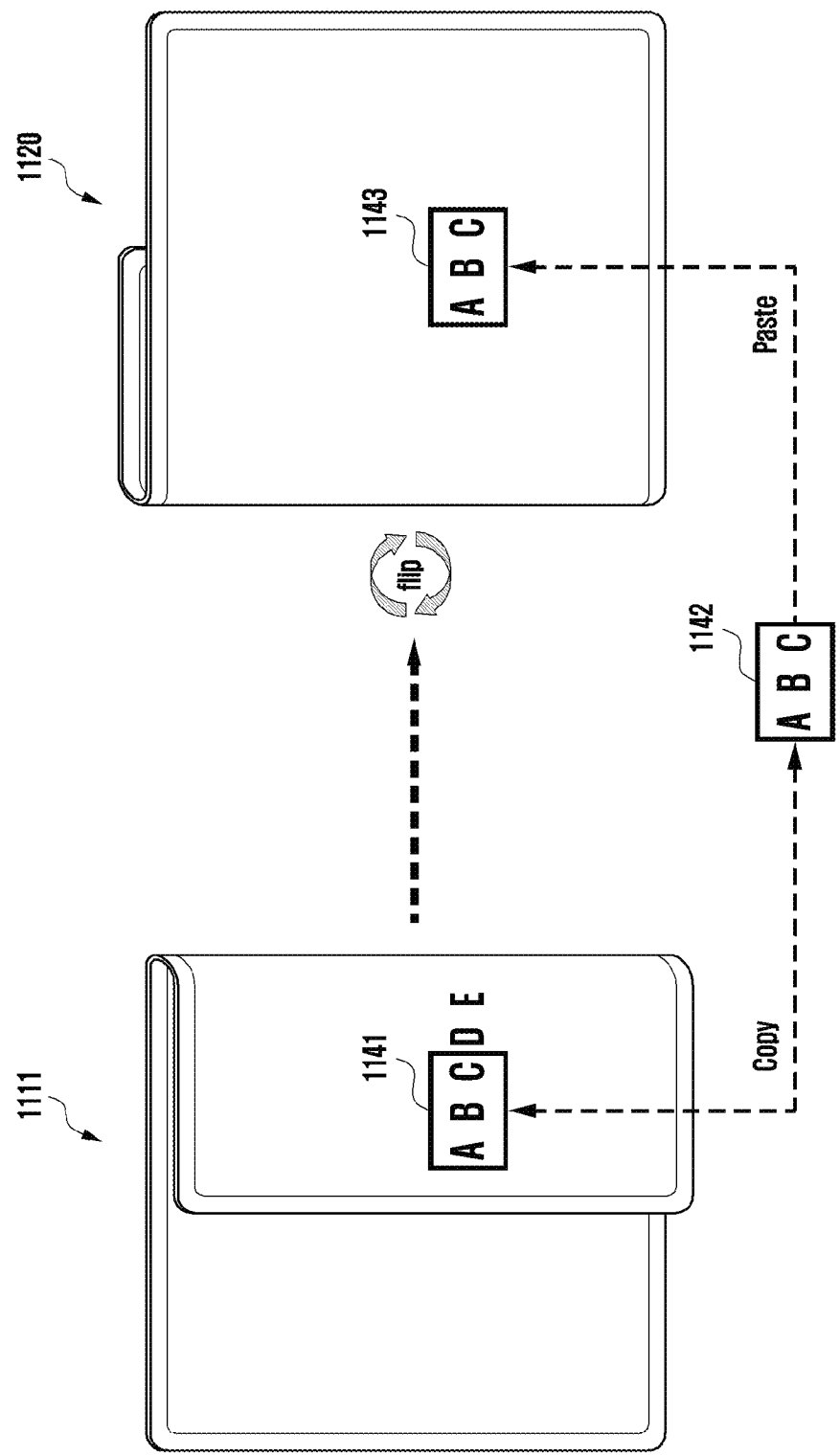

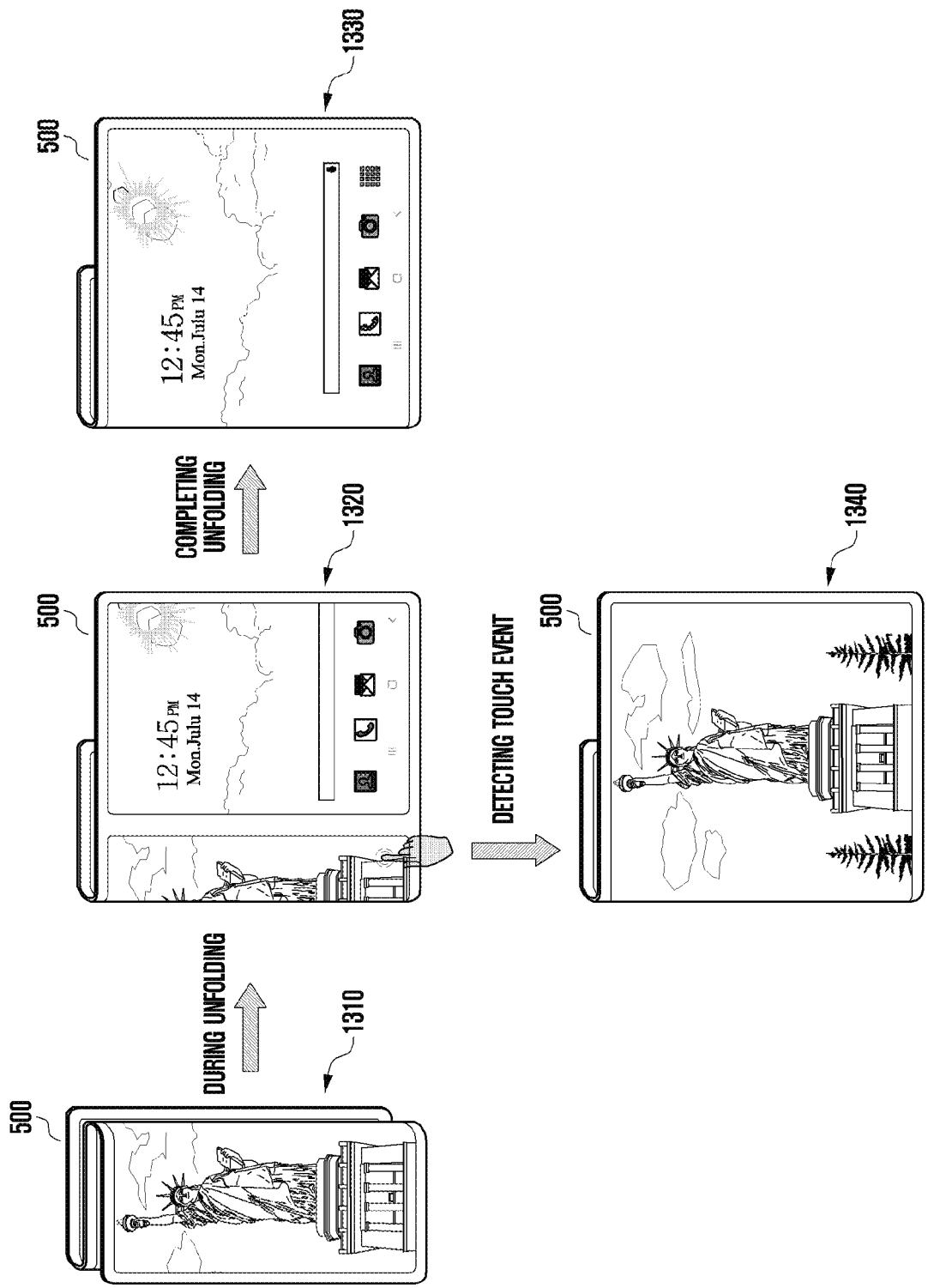

//USE METHOD ACCORDING TO FOLDING STATE OF DISPLAY, AND ELECTRONIC APPARATUS USING SAME

CROSS-REFERENCE TO RELATED APPLICATIONS

This application is a continuation of International Application No. PCT/KR2021/007998, designating the United States, filed on Jun. 25, 2021, in the Korean Intellectual Property Receiving Office and claiming priority to Korean Patent Application No. 10-2020-0078730, filed on Jun. 26, 2020, in the Korean Intellectual Property Office, the disclosures of which are incorporated by reference herein in their entireties.

BACKGROUND

Field

The disclosure relates to a method of using a display depending on the folding state of the same and an electronic device using the method.

Description of Related Art

It has become possible for portable electronic devices (hereinafter referred to as "electronic devices") typified by smartphones to be equipped with various functions. In order to allow a user to easily access various functions, the electronic devices may include a touch screen-based display and may provide screens of various applications via the display.

The electronic devices have been diversified in various shapes beyond a bar shape. Recently, electronic devices have been developed from a bendable type to a type in which a foldable display is provided or a type in which a display is expandable. An electronic device including such a display may provide convenience of use depending on various screen states.

A conventional electronic device may provide a continuous feeling of use to a user when a use area is changed depending on the change of state of the display. Accordingly, the user may continue to perform tasks that have been performed until the change of state of the display even after the state of the display is changed.

An electronic device including a foldable display operates such that two or more housing structures are foldable. Thus, it is possible to use the electronic device in various ways depending on the area of use of the display of the electronic device. A user may need a separate account or a separate operating environment depending on the area used for the display using one electronic device.

SUMMARY

An electronic device according to various example embodiments of the disclosure may include: a first display configured to be foldable about at least one axis; a sensor configured to detect the folding state of the first display; and a processor operatively connected to the first display and the sensor, wherein the processor may be configured to: detect the folding state of the first display using the sensor; determine a display area of the first display based on the folding state of the folding state of the first display; select an operating system (OS) corresponding to the folding state of the first display; and display a user interface (UI) generated by the operating system as a display area of the first display.

An electronic device according to various example embodiments of the disclosure may include: a first display configured to be foldable about at least one axis; a sensor configured to detect the folding state of the first display; a first housing including a first surface and a second surface located in a direction opposite to the first surface; a second housing including a third surface and a fourth surface located in a direction opposite to the third surface; a third housing including a fifth surface and a sixth surface located in a direction opposite to the fifth surface; a first hinge to which the first housing and the second housing are connected; a second hinge to which the second housing and the third housing are connected; and a processor operatively connected to the first display and the sensor, wherein the first display may be provided over the first surface of the first housing, the third surface of the second housing, and the fifth surface of the third housing, the at least one axis may include a first axis forming a folding axis of the first hinge and a second axis forming a folding axis of the second hinge, and based on the first display being folded, a first area and a second area, which are divided with reference to the first axis, may face away from each other, and the second area and a third area, which are divided with reference to the second axis, may face each other, and the processor may be configured to: in a state in which the first display is folded about the first axis and the second axis, provide the first area with a UI, which is generated by the first operating system, using the first operating system; in a state in which the display is unfolded about the second axis while being folded about the first axis, provide the second area and the third area with the UI, which is generated by the first operating system, using the first operating system; and in a state in which the display is unfolded about the first axis and the second axis, provide the display with a UI, generated by the second operating system, using the second operating system.

When the display of an example electronic device is a foldable display, it may be possible for the user to use the display depending on various areas. The user may establish a separate task environment through a plurality of accounts or operating systems in response to a change in the area of use of the display.

The electronic device, provided with a foldable display, may increase the utilization of the electronic device depending on the folding state, which may allow the user to experience various operating environments using a single electronic device and may reduce the inconvenience of using multiple devices.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 11A, 11B, 11C and 11D are diagrams each illustrating providing content at the time of a change of the folding state of a display of an electronic device according to various embodiments;

FIGS. 13A and 13B are diagrams each illustrating a UI change due to a change of the folding state of a display of an electronic device according to various embodiments.

DETAILED DESCRIPTION

Figure 1:
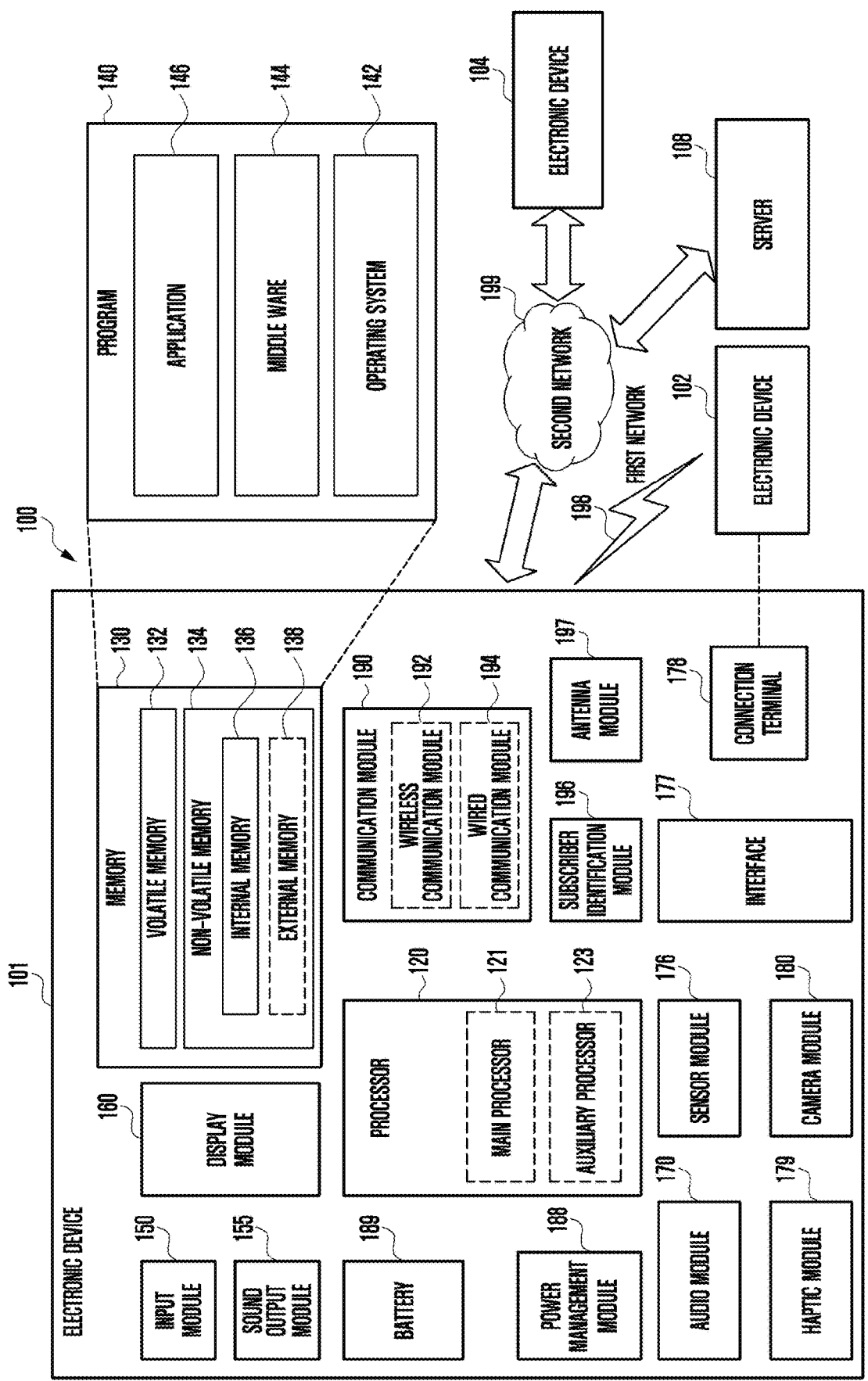
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (TMST)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
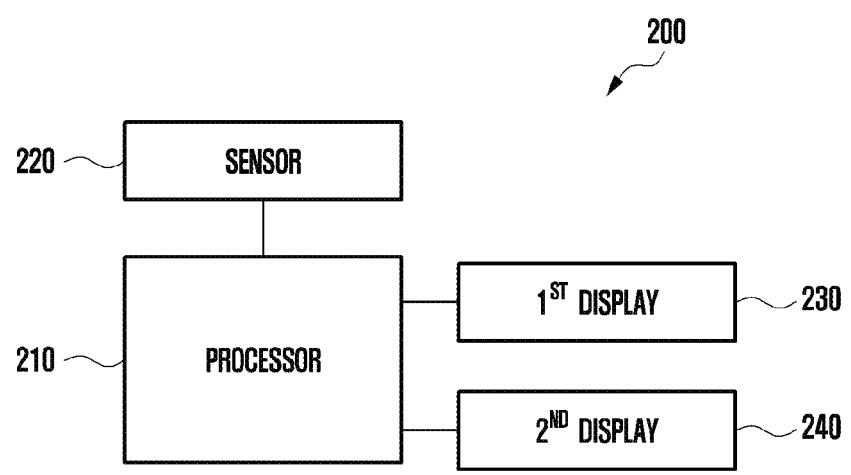
FIG. 2 is a block diagram illustrating an example configuration of an electronic device according to various embodiments.

FIG. 2 is a block diagram illustrating an example configuration of an electronic device according to various embodiments.

Referring to FIG. 2, an electronic device 200 (e.g., the electronic device 101 in FIG. 1) may include a processor (e.g., including processing circuitry) 210 (e.g., the processor 120 in FIG. 1), a sensor 220 (e.g., the sensor module 176 in FIG. 1), a first display (e.g., the display module 160 in FIG. 1), and a second display (e.g., the display module 160 in FIG. 1), and some of the illustrated components may be omitted or substituted. The electronic device may include at least some of the components and/or functions of the electronic device 101 in FIG. 1.

According to various embodiments, the electronic device may include a structure in which a provided display is foldable, and is not limited in any way. For example, in a folding method, the electronic device may be in-folded or out-folded, and may be folded vertically or horizontally about a folding axis.

According to various embodiments, the processor 210 may include various processing circuitry and is capable of performing an operation or data processing related to control and/or communication of each component of the electronic device 200, and may include at least some of the components and/or functions of the processor 120 of FIG. 1. The processor may be functionally, operatively, and/or electrically connected to internal components of the electronic device including the sensor, the first display, and the second display.

Referring to FIG. 2, the sensor 220 may detect the folding state of the electronic device. The folding state of the electronic device may be, for example, a state formed by the display of the electronic device. The sensor may perform a function of detecting the folding state of the electronic device, for example, the folding state of the display, and may include a gyro sensor, a magnetic sensor, an acceleration sensor, and the like. In addition, the sensor may be located on one surface of the housing of the electronic device or located within a hinge. The sensor according to various embodiments of the disclosure may include at least some of the components and/or functions of the sensor module 176 of FIG. 1.

The first display 230 according to various embodiments may refer to a flexible display of an electronic device. According to an embodiment, the first display may be a main display or an auxiliary display of the electronic device, and may be located on the front surface or the rear surface of the electronic device. In addition, the first display may be implemented with a flexible display or a general display. The first display according to various embodiments of the disclosure may include at least some of the components and/or functions of the display module 160 of FIG. 1.

The second display 240 according to various embodiments may refer to a general display of an electronic device. According to an embodiment, the second display may be a main display or an auxiliary display of the electronic device, and may be implemented with a flexible display or a general display. The second display according to various embodiments of the disclosure may include at least some of the components and/or functions of the display module 160 of FIG. 1.

Referring to FIG. 2, each of the first display 230 and the second display 240 may include a touch sensor, and the touch sensor may be implemented in any of various types including an in-cell type and an on-cell type.

Figure 3A:
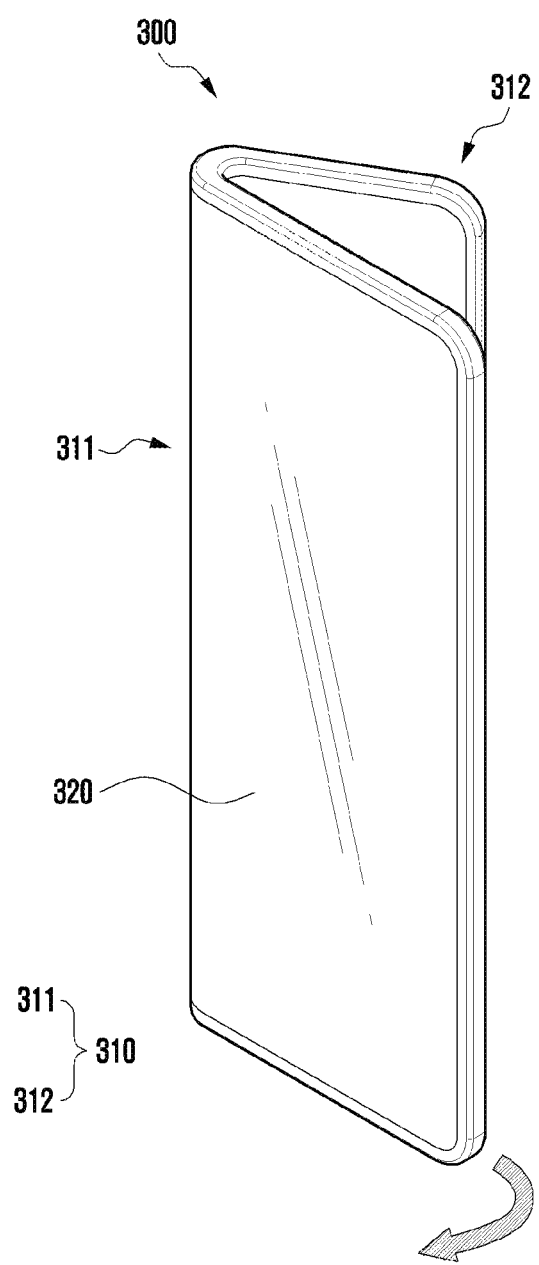
FIGS. 3A and 3B are perspective views illustrating the folding state of a display of an electronic device according to various embodiments.
Figure 3B:
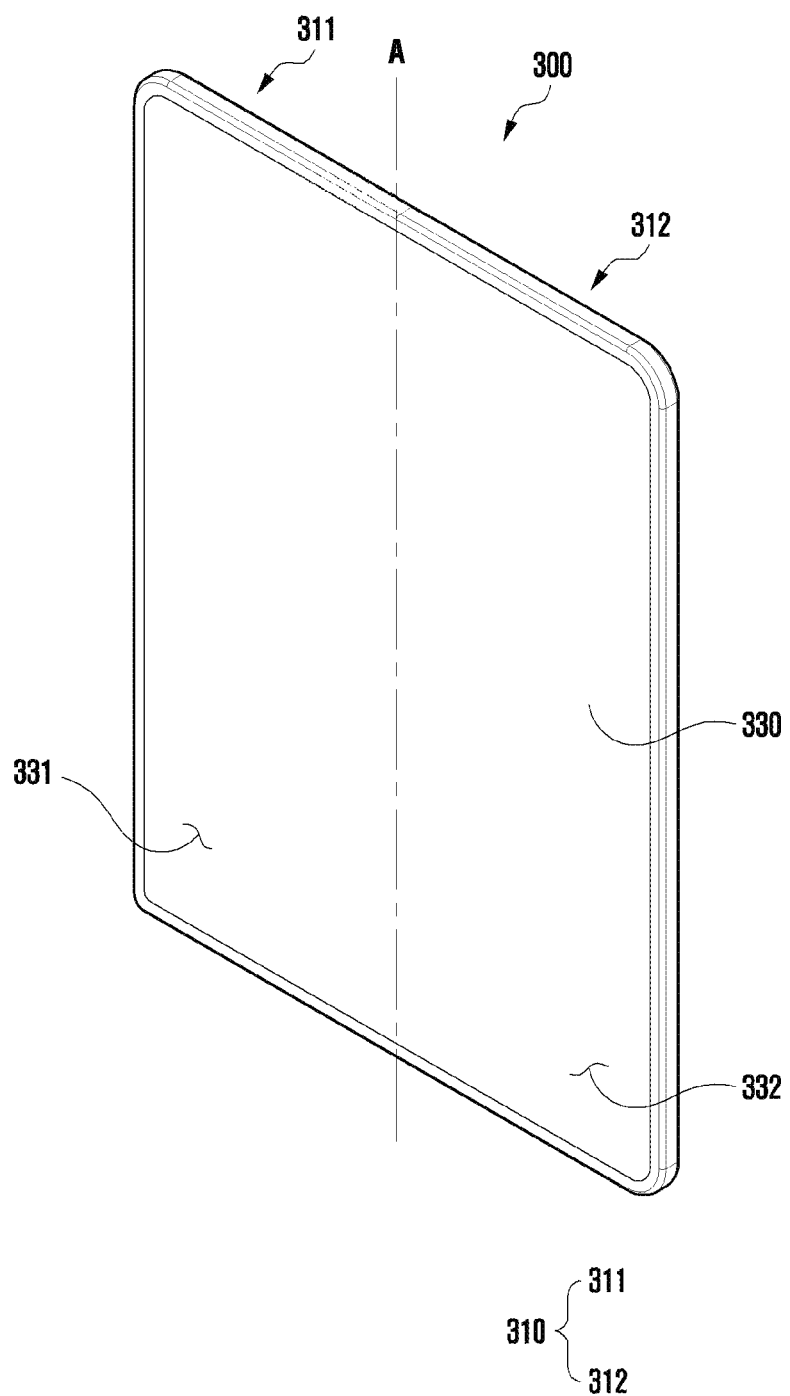

FIGS. 3A and 3B are perspective views illustrating the folding state of a display of an electronic device according to various embodiments.

Referring to FIGS. 3A and 3B, an electronic device 300 (e.g., the electronic device 101 in FIG. 1 or the electronic device 200 in FIG. 2) according to various embodiments may include a first housing 311, a second housing 312, a first display 330, and a second display 320, and may also include at least some of the components and/or functions of the electronic device 101 of FIG. 1 and/or the electronic device 200 of FIG. 2. The first housing 311 and the second housing 312 may correspond to individual housings of a housing structure 310, and may be folded about at least one axis (e.g., the axis A in FIG. 3B) to be overlapped each other.

The first housing 311 may include a first surface and a second surface, and the second housing 312 may include a third surface and a fourth surface. For example, when the first display 330 of the electronic device 300 is folded about the axis A, the first surface of the first housing 311 and the third surface of the second housing 312 may be overlapped to face each other. Here, when the first display 330 is in the folded state, for example, the first surface of the first housing 311 and the third surface of the second housing 312 may form a narrow angle (e.g., 0 to 5 degrees) therebetween. The folded state may refer, for example, to a closed state, and may refer, for example, to a state in which the electronic device 300 is fully folded. The first display 330 may be divided into a first area 331 and a second area 332 as areas in which content is displayed, wherein the first area may be located on the first surface of the first housing 311, and the second area may be located on the third surface of the second housing 312.

The first housing 311 and the second housing 312 may be disposed on opposite sides about the folding axis (e.g., the axis A), and may have generally symmetrical shapes with respect to the folding axis. Referring to FIG. 3B, the first housing 311 may be located on the left side with respect to the folding axis, and the second housing 312 may be located on the right side with respect to the folding axis. The first housing 311 and the second housing 312 may be designed to be folded with respect to each other, and in the folded state, the first surface of the first housing and the third surface of the second housing may be overlapped to face each other.

According to various embodiments, a hinge may be provided between the first housing 311 and the second housing 312, so that the first housing and the second housing of the electronic device 300 may be folded to be overlapped each other. However, the housing structure 310 in which the housings of the electronic device are disposed on the left and right sides with respect to the folding axis is merely an example, and the housing structure 310 may have housings disposed on the upper and lower sides with respect to the folding axis of the electronic device.

The angle or distance between the first housing 311 and the second housing 312 may vary depending on whether the first display 330 of the electronic device 300 is in the unfolded state (or an opened state), the folded state (or a closed state), or the intermediate state. For example, the unfolded state may refer, for example, to an opened state or a flat state. The state in which the first display 330 of the electronic device 300 is unfolded may refer, for example, to a state in which the first housing 311 and the second housing 312 are arranged side by side, which may refer, for example, to a state in which the electronic device 300 is fully unfolded. When the first display 330 is in the unfolded state, the first housing 311 and the second housing 312 form an angle of 180 degrees therebetween, in which the first surface of the first housing and the third surface of the second housing are arranged to be oriented in the same direction.

When the first display of the electronic device 300 is in the intermediate state, the first housing and the second housing are arranged to form a predetermined angle therebetween, and may not be the folded state or the unfolded state. The intermediate state may refer, for example, to a state in which the first surface of the first housing 311 and the third surface of the second housing 312 form a predetermined angle (e.g., 6 to 179 degrees) therebetween.

The electronic device may include a second display 320 (e.g., the display module 160 in FIG. 1) in at least a portion of the first housing 311 or the second housing 312. Referring to FIG. 3A, the second display 320 may be provided on at least a portion of the second surface of the first housing 311 of the electronic device 300. The second display 320 may be disposed on the fourth surface of the second housing 312, or may be disposed over a part or the whole of the second surface of the first housing and the fourth surface of the second housing. The second display may include at least some of the components and/or functions of the display module 160 of FIG. 1.

Figure 4A:
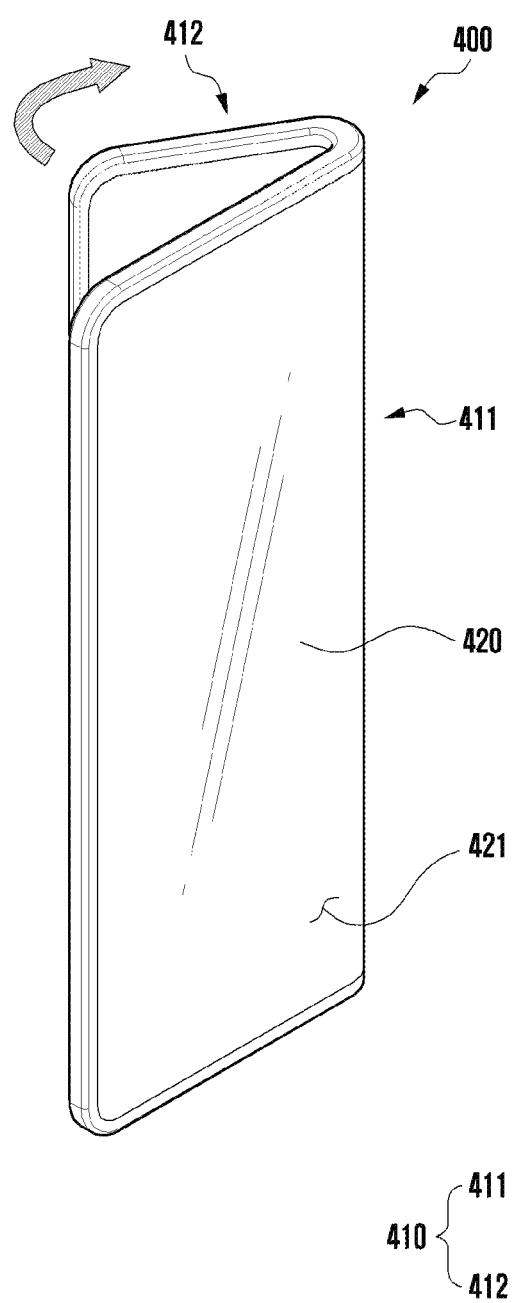
FIGS. 4A and 4B are perspective views illustrating the folding state of a display of an electronic device according to various embodiments.
Figure 4B:
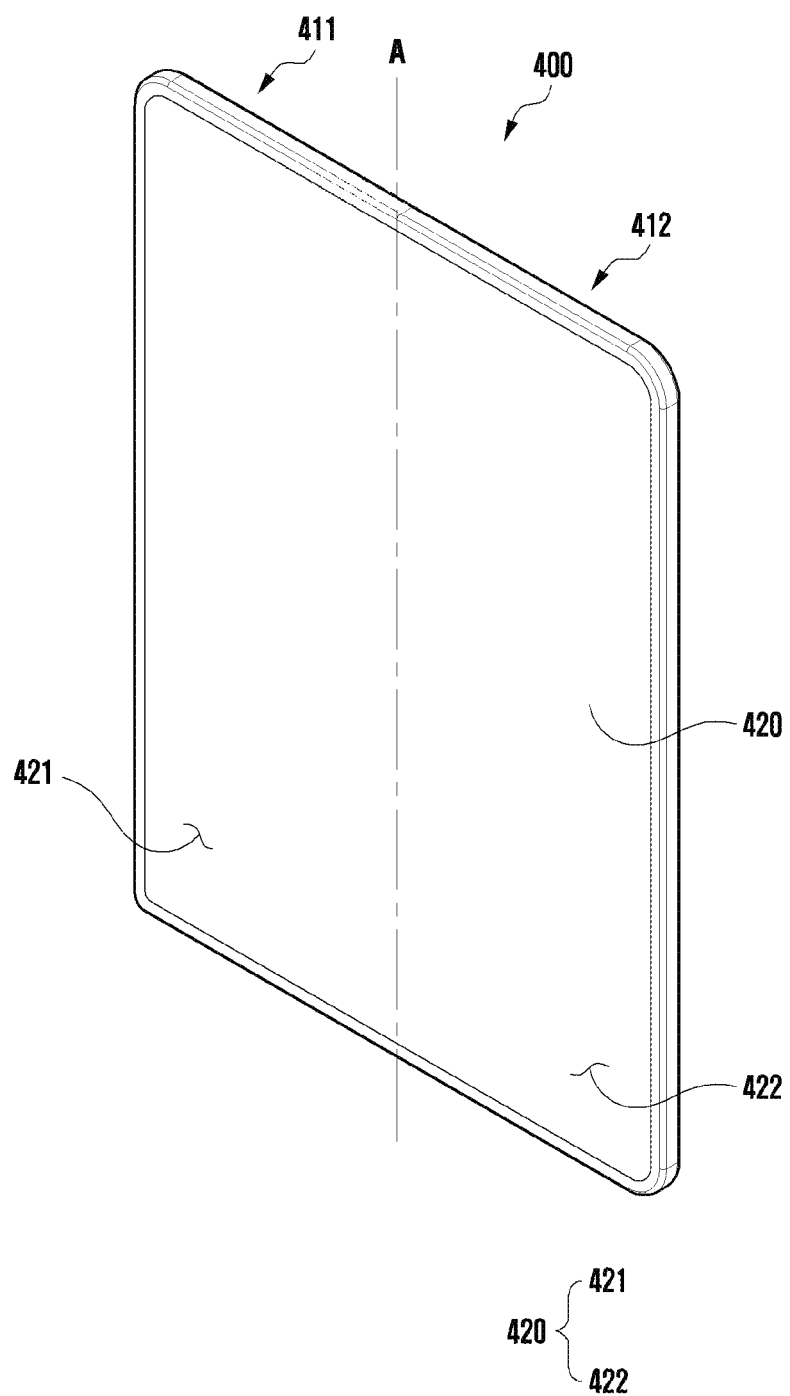

FIGS. 4A and 4B are perspective views illustrating the folding state of a display of an electronic device according to various embodiments.

Referring to FIGS. 4A and 4B, an electronic device 400 (e.g., the electronic device 101 of FIG. 1, the electronic device 200 of FIG. 2, or the electronic device 300 of FIGS. 3A and 3B) according to various embodiments may include a first housing 411, a second housing 412, and a first display 420, and may include at least some of the components and/or functions of the electronic device 101 of FIG. 1, the electronic device 200 of FIG. 2, and/or the electronic device 300 of FIG. 3. The first housing 411 and the second housing 412 may correspond to individual housings of a housing structure 410, and may be folded about at least one axis (e.g., the axis A in FIG. 4B) to be overlapped each other.

The first housing 411 may include a first surface and a second surface, and the second housing 412 may include a third surface and a fourth surface. For example, when the first display 420 of the electronic device 400 is folded about the axis A, the first surface of the first housing 411 and the third surface of the second housing 412 may be overlapped to face away from each other, and the second surface of the first housing and the fourth surface of the second housing may be overlapped to face each other. Here, when the first display 420 is in the folded state, for example, the second surface of the first housing 411 and the fourth surface of the second housing 412 may form a narrow angle (e.g., 0 to 5 degrees) therebetween. The folded state may refer, for example, to a closed state, and may refer, for example, a state in which the electronic device 400 is fully folded. The first display 420 may be divided into a first area 421 and a second area 422 as areas in which content is displayed, wherein the first area may be located on the first surface of the first housing 411, and the second area may be located on the third surface of the second housing 412.

The first housing 411 and the second housing 412 may be disposed on opposite sides about the folding axis (e.g., the axis A), and may have generally symmetrical shapes with respect to the folding axis. Referring to FIG. 4B, the first housing 411 may be located on the left side with respect to the folding axis, and the second housing 412 may be located on the right side with respect to the folding axis. The first housing 411 and the second housing 412 may be designed to be folded with respect to each other, and in the folded state, the second surface of the first housing and the fourth surface of the second housing may be overlapped to face each other.

According to various embodiments, a hinge may be provided between the first housing 411 and the second housing 412, so that the first housing and the second housing of the electronic device 400 may be folded to be overlapped each other. However, the housing structure 410 in which the housings of the electronic device are disposed on the left and right sides with respect to the folding axis is merely an example, and the housing structure 310 may have housings disposed on the upper and lower sides with respect to the folding axis of the electronic device.

The angle or distance between the first housing 411 and the second housing 412 may vary depending on whether the first display 420 of the electronic device 400 is in the unfolded state (or an opened state), the folded state (or a closed state), or the intermediate state. For example, the unfolded state may refer, for example, to an opened state or a flat state. The state in which the first display 420 of the electronic device 400 is unfolded may refer, for example, to a state in which the first housing 411 and the second housing 412 are arranged side by side, which may refer, for example, to a state in which the electronic device 400 is fully unfolded. When the first display 420 is in the unfolded state, the first housing 411 and the second housing 412 form an angle of 180 degrees therebetween, in which the first surface of the first housing and the third surface of the second housing are arranged to be oriented in the same direction.

When the first display of the electronic device 400 is in the intermediate state, the first housing and the second housing are arranged to form a predetermined angle therebetween, and may not be the folded state or the unfolded state. The intermediate state may refer, for example, to a state in which the second surface of the first housing 411 and the fourth surface of the fourth housing 412 form a predetermined angle (e.g., 6 to 179 degrees) therebetween.

FIGS. 5A, 5B, 5C, 5D and 5E include perspective views and diagrams illustrating the folding state of a display of an electronic device according to various embodiments.

Figure 5A:
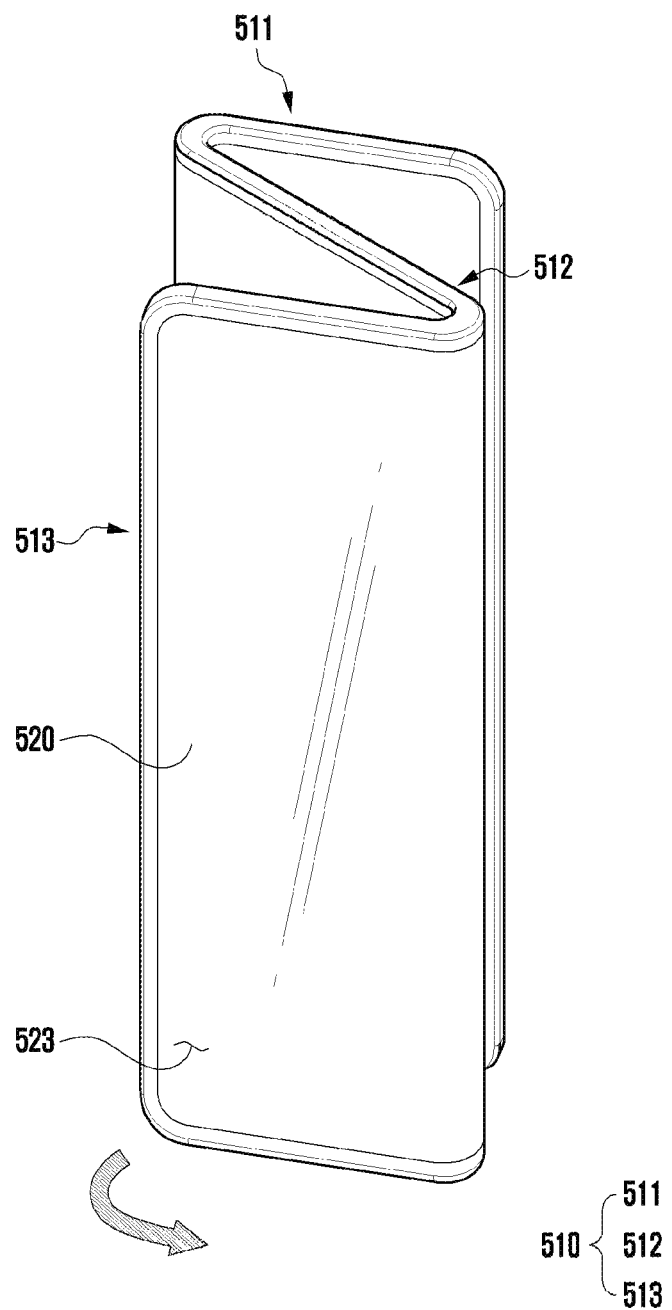
FIGS. 5A, 5B, 5C, 5D and 5E include perspective views and diagrams illustrating the folding state of a display of an electronic device according to various embodiments.
Figure 5B:
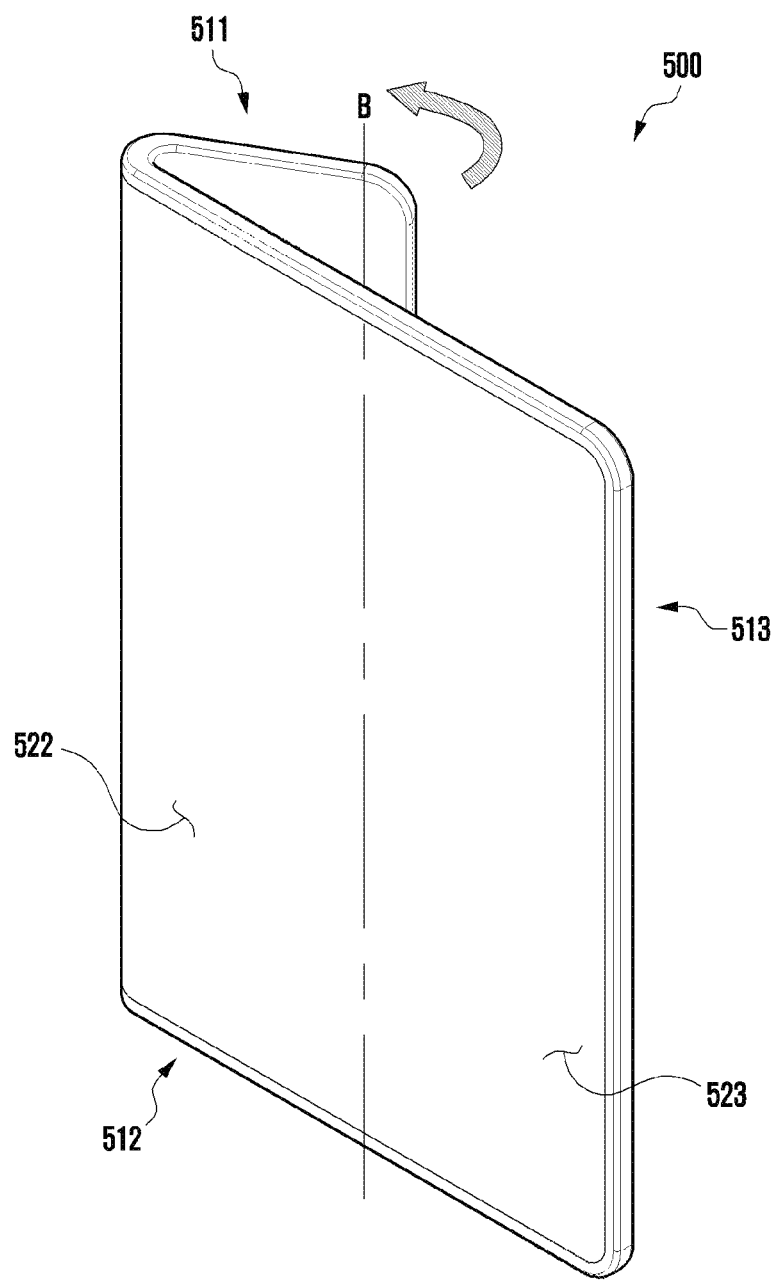
Figure 5C:
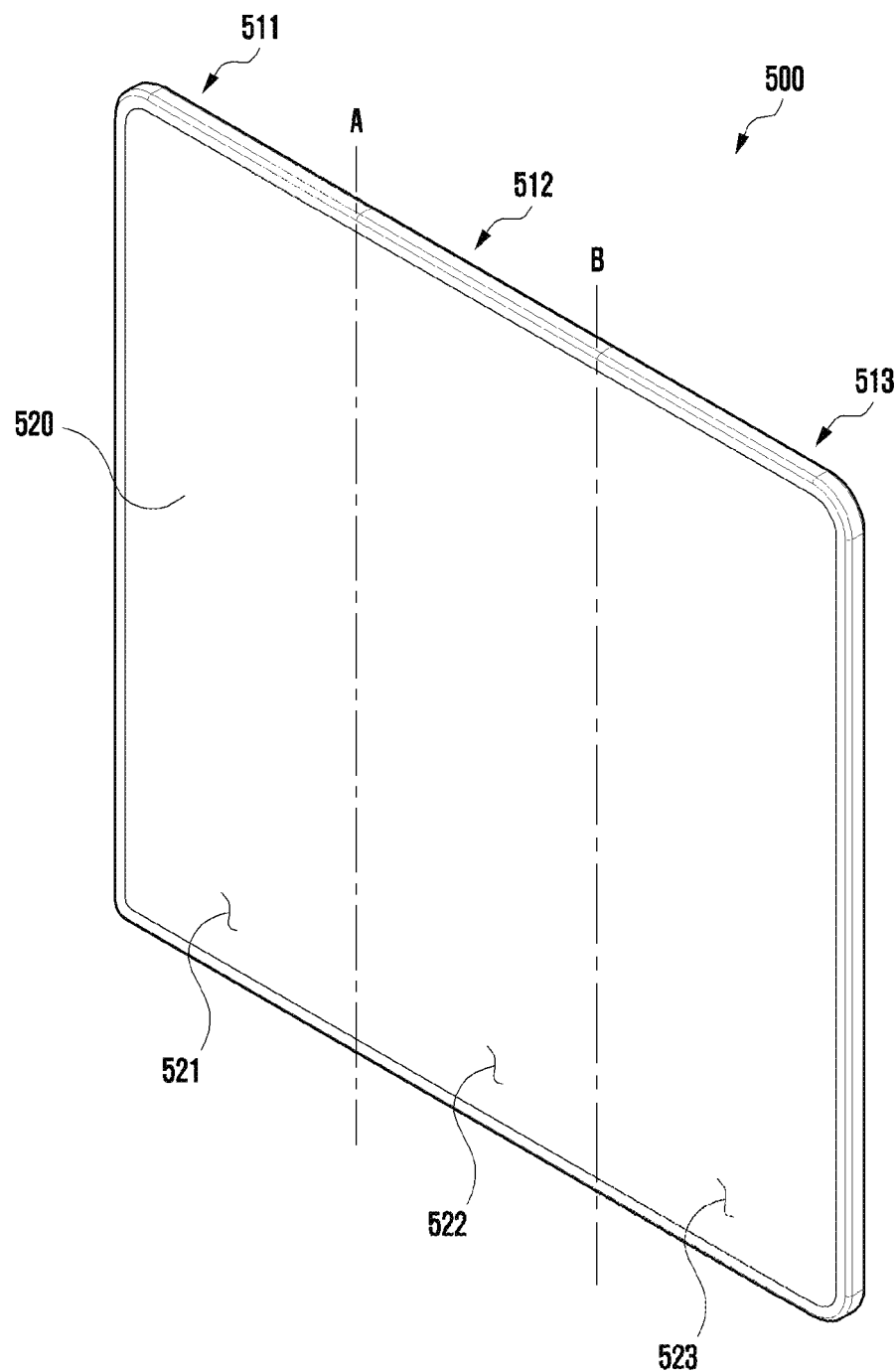

Referring to FIGS. 5A, 5B and 5C, an electronic device 500 (e.g., the electronic device 101 in FIG. 1, the electronic device 200 in FIG. 2, the electronic device 300 in FIGS. 3A and 3B, or the electronic device 400 in FIGS. 4A and 4B) according to various embodiments may include a first housing 511, a second housing 512, a third housing 513, and a first display 520, and may include at least some of the components and/or functions of the electronic device 101 of FIG. 1, the electronic device 200 of FIG. 2, the electronic device 300 of FIGS. 3A and 3B, and/or the electronic device 400 of FIGS. 4A and 4B. The first housing 511, the second housing 512, and the third housing 513 may correspond to individual housings of the housing structure 510, and may be folded about one or more axes (e.g., axes A and B in FIG. 5C) to be overlapped each other.

The first housing 511 may include a first surface and a second surface, the second housing 512 may include a third surface and a fourth surface, and the third housing 513 may include a fifth surface and a sixth surface. For example, when the first display 520 of the electronic device 500 is folded about the axis A, the first surface of the first housing 511 and the third surface of the second housing 512 may be overlapped to face away from each other, and the second surface of the first housing and the fourth surface of the second housing may be overlapped to face each other. In addition, when the first display 520 is folded about the axis B, the third surface of the second housing 512 and the fifth surface of the third housing 513 may be overlapped to face each other, and the fourth surface of the second housing and the sixth surface of the third housing may be overlapped to face away from each other. According to an embodiment, when the first display 520 is in the folded state, the second surface of the first housing 511 and the fourth surface of the second housing 512 may form a narrow angle (e.g., 0 to 5 degrees) therebetween. According to an embodiment, when the first display 520 is in the folded state, the third surface of the second housing 512 and the fifth surface of the third housing 513 may form a narrow angle (e.g., 0 to 5 degrees) therebetween. The folded state may refer, for example, to a closed state, and may refer, for example, to a state in which the electronic device 500 is fully folded. For example, the folded state may refer, for example, to the state in which the electronic device is folded about both the axis A and the axis B, the state in which the electronic device is folded about only the axis A and is not folded about the axis B, or the state in which the electronic device is not folded about the axis A and is folded about the axis B. The first display 520 may be divided into a first area 521, a second area 522, and a third area 523 as areas in which content is displayed. The first area may be located on the first surface of the first housing 511, the second area may be located on the third surface of the second housing 512, and the third area may be located on the fifth surface of the third housing 513.

The first housing 511 and the second housing 512 may be disposed on opposite sides about the folding axis (e.g., the axis A), and the second housing 512 and the third housing 513 may be disposed on opposite sides about the folding axis (e.g., the axis B) and may have symmetrical shapes with respect to the folding axis. Referring to FIG. 5C, the first housing 511 may be located on the left side about the A axis, and the second housing 512 may be located on the right side about the A axis. The second housing 512 may be located on the left side about the axis B, and the third housing 513 may be located on the right side about the axis B. The first housing 511 and the second housing 512, and the second housing and the third housing 513 may be designed to be folded with respect to each other.

According to various embodiments, hinges may be provided between the first housing 511 and the second housing 512 and between the second housing and the third housing 513, respectively. The first housing, the second housing, and the third housing of the electronic device 500 may be folded to be overlapped by the hinge provided between the individual housings 511, 512, and 513 of the housing structure 510. However, the housing structure 510 in which the housings of the electronic device are disposed on the left and right sides with respect to the folding axis is merely an example, and the housing structure 510 may have housings disposed on the upper and lower sides with respect to the folding axis of the electronic device.

The angles or distances between the first housing 511, the second housing 512, and the second housing 5132 may vary depending on whether the first display 520 of the electronic device 500 is in the unfolded state (or an opened state), the folded state (or a closed state), or the intermediate state. For example, the unfolded state may refer, for example, to an opened state or a flat state.

According to an embodiment, the unfolded state of the first display 520 may refer, for example, to the state in which the first housing 511, the second housing 512, and the third housing 513 are arranged side by side, and the electronic device 500 is fully unfolded. According to an embodiment, the unfolded state may include the state in which the first display 520 is only partially unfolded. The state in which the first display 520 is only partially unfolded may refer, for example, to the state in which the second housing 512 and the third housing 513 are arranged side by side and the first housing 511 and the second housing are folded. When the first display 520 is in the unfolded state, the first housing 511 and the second housing 512 may form an angle of 180 degrees therebetween, and the second housing and the third housing 513 may form an angle of 180 degrees therebetween. The unfolded state may include the state in which the first surface of the first housing 511, the third surface of the second housing 512, and the fifth surface of the third housing 513 are oriented in the same direction. According to an embodiment, when the first display is in an only partially unfolded state, it may refer, for example, to that the second surface of the first housing 511, the third surface of the second housing 512, and the fifth surface of the third housing 513 are disposed to be oriented in the same direction.

When the first display 520 is in the intermediate state, the first housing 511 and the second housing 512 are disposed at a predetermined angle, and may be neither in the folded state nor in the unfolded state. The intermediate state may refer, for example, to a state in which the second surface of the first housing 511 and the fourth surface of the fourth housing 512 form a predetermined angle (e.g., 6 to 179 degrees) therebetween. In addition, the intermediate state may refer, for example, to a state in which the third surface of the second housing 512 and the fifth surface of the third housing 513 form a predetermined angle (e.g., 6 to 179 degrees) therebetween.

Figure 5D:
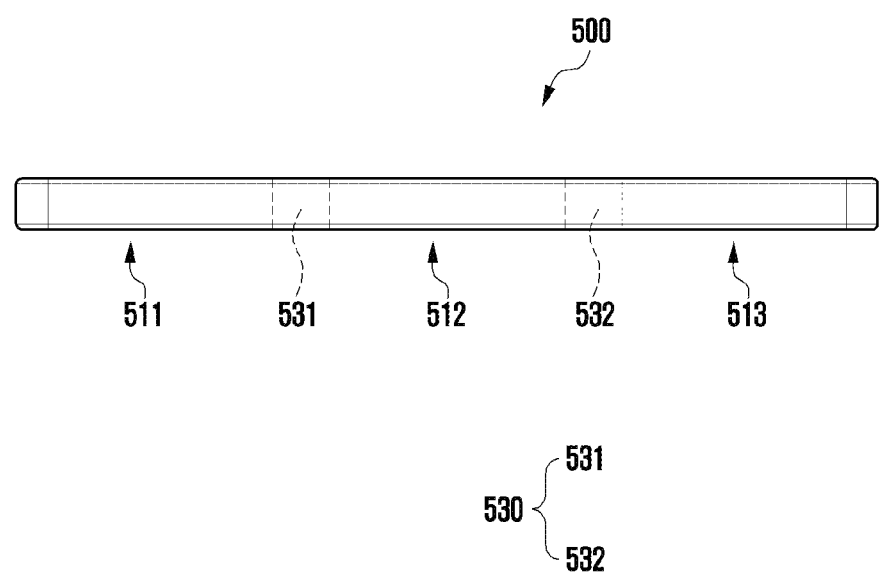

Referring to FIG. 5D, there may be folding axes of the axis A and the axis B between the individual housings 511, 512, and 513 of the electronic device 500. One or more folding axes may be provided by hinges that may be provided between the individual housings 511, 512, and 513. A plurality of hinges may be provided for folding of the individual housings 511, 512, and 513, and the number of hinges may be the same as the number of folding axes. A hinge structure 530 may include a first hinge 531 and a second hinge 532. The first hinge 531 may be provided between the first housing 511 and the second housing 512, and the second hinge 532 may be provided between the second housing 512 and the third housing 513.

Figure 5E:
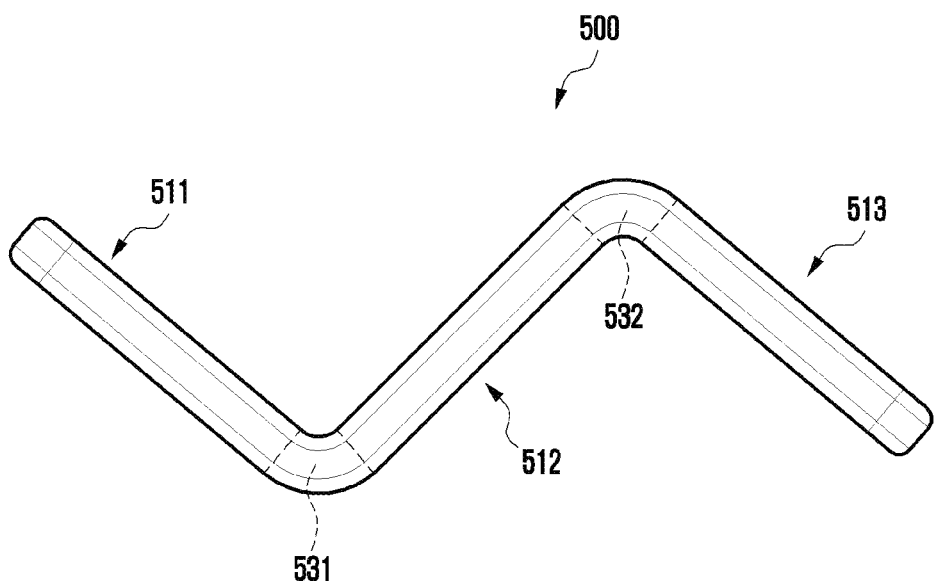

FIG. 5E is a diagram illustrating an example structure in which the folding state of the first display 520 is changed by the hinge structure 530 according to various embodiments. Referring to FIG. 5E, the first housing 511 and the second housing 512 may form an intermediate state. At this time, the first housing 511 and the second housing 512, which have been in the unfolded state, may be transformed by the first hinge 531 into the folded state in which the second surface of the first housing and the fourth surface of the second housing are overlapped to face each other. Referring to FIG. 5E, the second housing 512 and the second housing 513 may be in the intermediate state. At this time, the second housing 512 and the third housing 513, which have been in the unfolded state, may be transformed by the second hinge 532 into the folded state in which the third surface of the second housing and the fifth surface of the third housing are overlapped to face each other.

Figure 6A:
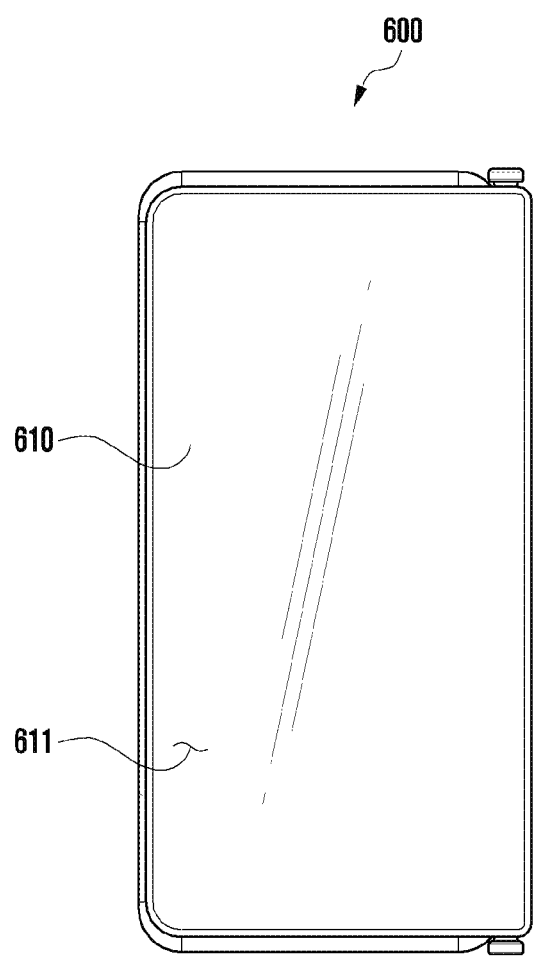
FIGS. 6A and 6B are diagrams illustrating various states of a display of an electronic device according to various embodiments.
Figure 6B:
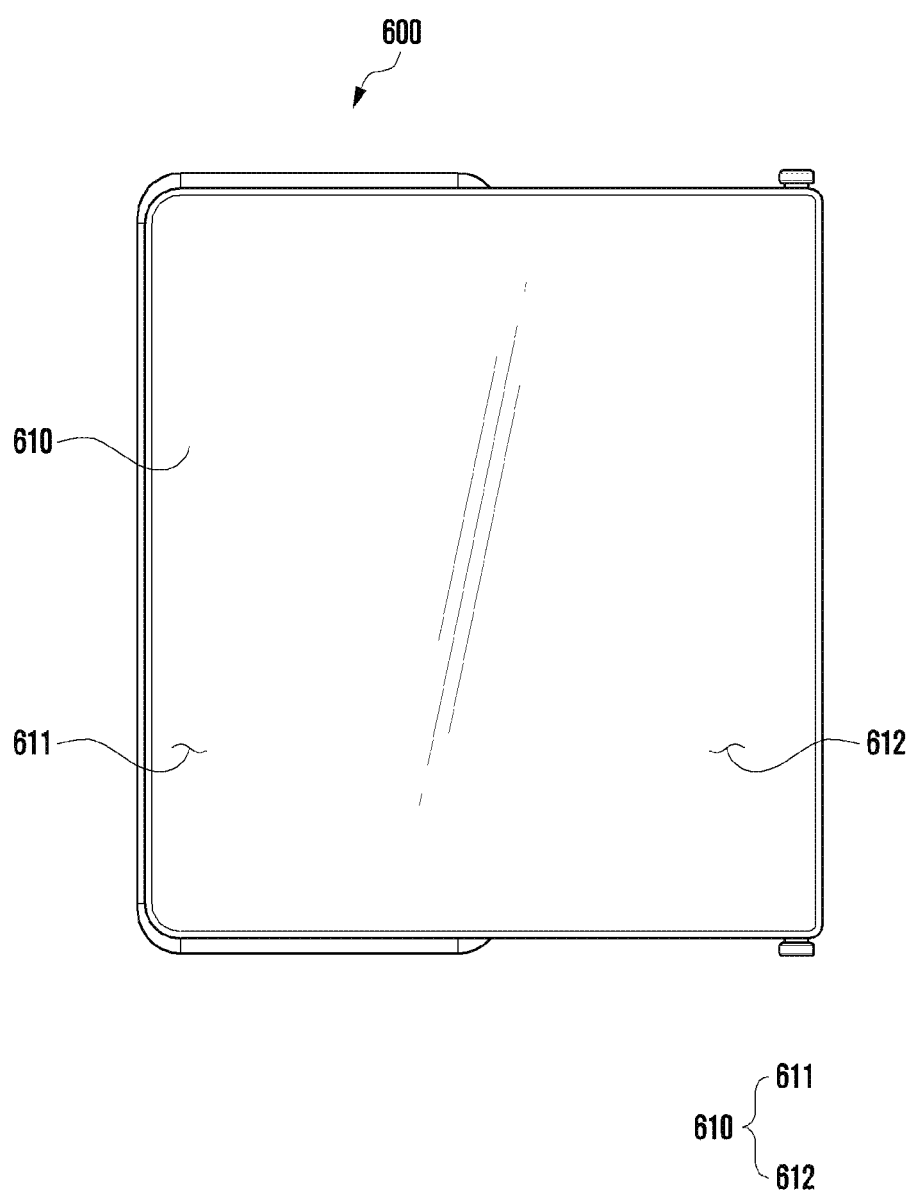

FIGS. 6A and 6B are diagrams illustrating various states of a display of an electronic device according to various embodiments.

Referring to FIGS. 6A and 6B, an electronic device 600 (e.g., the electronic device 101 in FIG. 1 or the electronic device 200 in FIG. 2) according to various embodiments may include a housing and a first display 610, and may also include at least some of the components and/or functions of the electronic device 101 of FIG. 1 and/or the electronic device 200 of FIG. 2. A partial area of the first display 610 may be rolled or folded inside the housing, and may be expanded horizontally or vertically via at least one roller structure or the like.

The first display 610 may be divided into a first area 611 and a second area 612 as areas in which content is displayed. The first area 611 may correspond to an area in which the electronic device 600 displays content in the rolled state of or pre-sliding state of the first display 610. The second area 612 may correspond to an additional area in which the electronic device 600 displays content in the unrolled state or post-sliding state of the first display 610. Here, the additional area may refer, for example, to an expanded display area of the first display, other than the first area 611 of the first display 610 in which content is displayed in the rolled state or pre-sliding state.

Referring to FIGS. 3A to 6B, the rolled state or pre-sliding state of the electronic device 600 may correspond to the folded state. For example, the rolled state or pre-sliding state may correspond to the closed state. The unrolled state or post-sliding state of the electronic device 600 may correspond to the unfolded state. For example, the unfolded state or post-sliding state may correspond to the opened state.

In addition to the form illustrated in FIGS. 6A and 6B, in the electronic device 600, the use area in the display when unfolded may be increased up to three times that in the rolled state. In this case, the rolled or rolled-in and hidden display may be at least twice the area of the display in the folded state.

Figure 7:
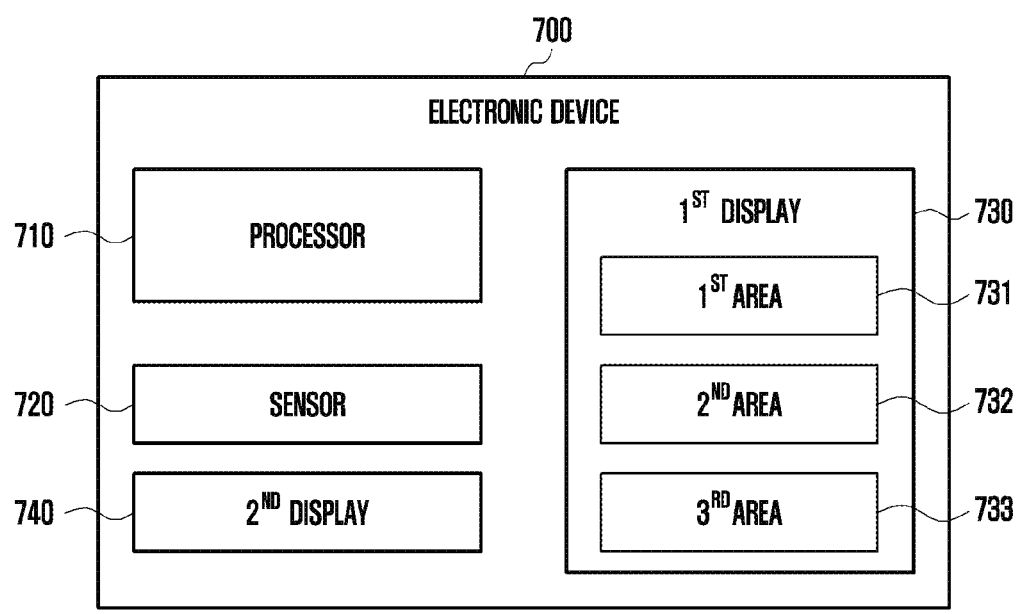
FIG. 7 is a block diagram illustrating an example configuration of an electronic device that provides various task environments based on detection of the folding state of a display according to various embodiments.

FIG. 7 is a block diagram illustrating an example configuration of an electronic device that provides various task environments based on detection of the folding state of a display according to various embodiments.

Referring to FIG. 7, an electronic device 700 (e.g., the electronic device 101 of FIG. 1, the electronic device 200 of FIG. 2, the electronic device 300 of FIG. 3A, the electronic device 400 of FIG. 4A, the electronic device 500 of FIG. 5A, and the electronic device 600 of FIG. 6A) may include a processor (e.g., including processing circuitry) 710, a sensor 720, a first display 730, and a second display 740, and some of the illustrated components may be omitted or substituted. The electronic device may include at least some of the components and functions of the electronic device 101 of FIG. 1, the electronic device 200 of FIG. 2, and/or the electronic devices 300, 400, 500, and 600 of FIGS. 3A to 6B.

According to various embodiments, the electronic device may include the components of FIGS. 3A to 6B and may include a foldable structure. In addition, the electronic device may be folded up and down and/or left and right about a folding axis.

According to various embodiments, the processor 710 (e.g., the processor 120 in FIG. 1 or the processor 210 in FIG. 2) may include various processing circuitry and perform operations or data processing related to control and/or communication of respective components of the electronic device, and may include at least some of the components and/or functions of the processor 120 of FIG. 1. The processor may be functionally, operatively, and/or electrically connected to internal components of the electronic device including the sensor, the first display, and the second display.

According to various embodiments, the processor 710 may identify the folding state of the first display 730 detected using the sensor 720. The processor may identify the folded angle of the first display detected by the sensor (e.g., a smaller angle among the angles between the housings of the electronic device).

According to various embodiments, the sensor 720 (e.g., the sensor module 176 in FIG. 1 or the sensor 220 in FIG. 2) may detect the folding state of the first display 730. For example, the sensor 720 may detect angles formed by individual housings including the first area 731, the second area 732, and the third area 733 of the first display 730. The sensor 720 may detect the folding state of the first display 730 by detecting a smaller angle (e.g., 180 degrees or less) among the angles between the housings.

According to an embodiment, depending on the folding state of the first display 730 (e.g., the display module 160 in FIG. 1, the first display 230 in FIG. 2, the first display 330 in FIG. 3A, or the first display module in FIG. 4B) according to the folded state of the first display 420, the first display 520 of FIG. 5A, and the first display 610 of FIG. 6A), the electronic device may execute respective operating modes corresponding to a first state, a second state, and a third state. For example, the electronic device may be used as a smartphone in the first state, as a tablet PC in the second state, or as a PC in the third state. The first state, the second state, and the third state may be named according to the order in which the use area in the first display increases, and the disclosure is not limited to the illustrated states and modes.

According to an embodiment, the first state may correspond to using the first display in a state of being folded about all of a plurality of folding axes. For example, when the first display is folded about both folding axes (e.g., the axis A and the axis B), the user may use the electronic device fully overlapped with the smallest area. This case may correspond to the first state, and the first area of the first display may be used. According to an embodiment, the first state may be the state in which the first display is folded about one folding axis (e.g., the axis A) and is unfolded about another folding axis (e.g., the axis B). For example, when only the first area 731 is used by flipping the portion spanning over the second and third areas of the first display of the electronic device rearward rather than using the portion, the user may use the electronic device in the first state. In this case, the electronic device may be used in the first state (e.g., used as the first state by being flipped from the second state) or in the second state.

According to an embodiment, the second state may correspond to using the first display in a state of being folded about some of the plurality of folding axes. For example, with reference to two folding axis (e.g., the axis A and the axis B), when the first display is folded about the axis A and unfolded about the axis B, the user may use a portion spanning over the second area 732 and the third area 733 of the first display. This case may correspond to the second state, and in the case where flipping is performed, the electronic device may be used in the first state using the first area 731 of the first display.

According to an embodiment, the third state may correspond to using the first display in a state of being unfolded about all of a plurality of folding axes. For example, when the first display is unfolded about both the folding axes (e.g., the axis A and the axis B), the user may use the electronic device fully overlapped with the smallest area. This case may correspond to the third state, and the entire area 731 to 733 of the first display (e.g., the area spanning over the first to third areas) may be used.

Referring to FIG. 7, the second display 740 (e.g., the display module 160 in FIG. 1, the second display 240 in FIG. 2, or the second display 320 in FIG. 3A) may refer to a general display of an electronic device. According to an embodiment, the second display 740 may be a main display or an auxiliary display of the electronic device, and may be implemented with a flexible display or a general display. The second display according to various embodiments of the disclosure may include at least some of the components and/or functions of the display module 160 of FIG. 1.

Figure 8:
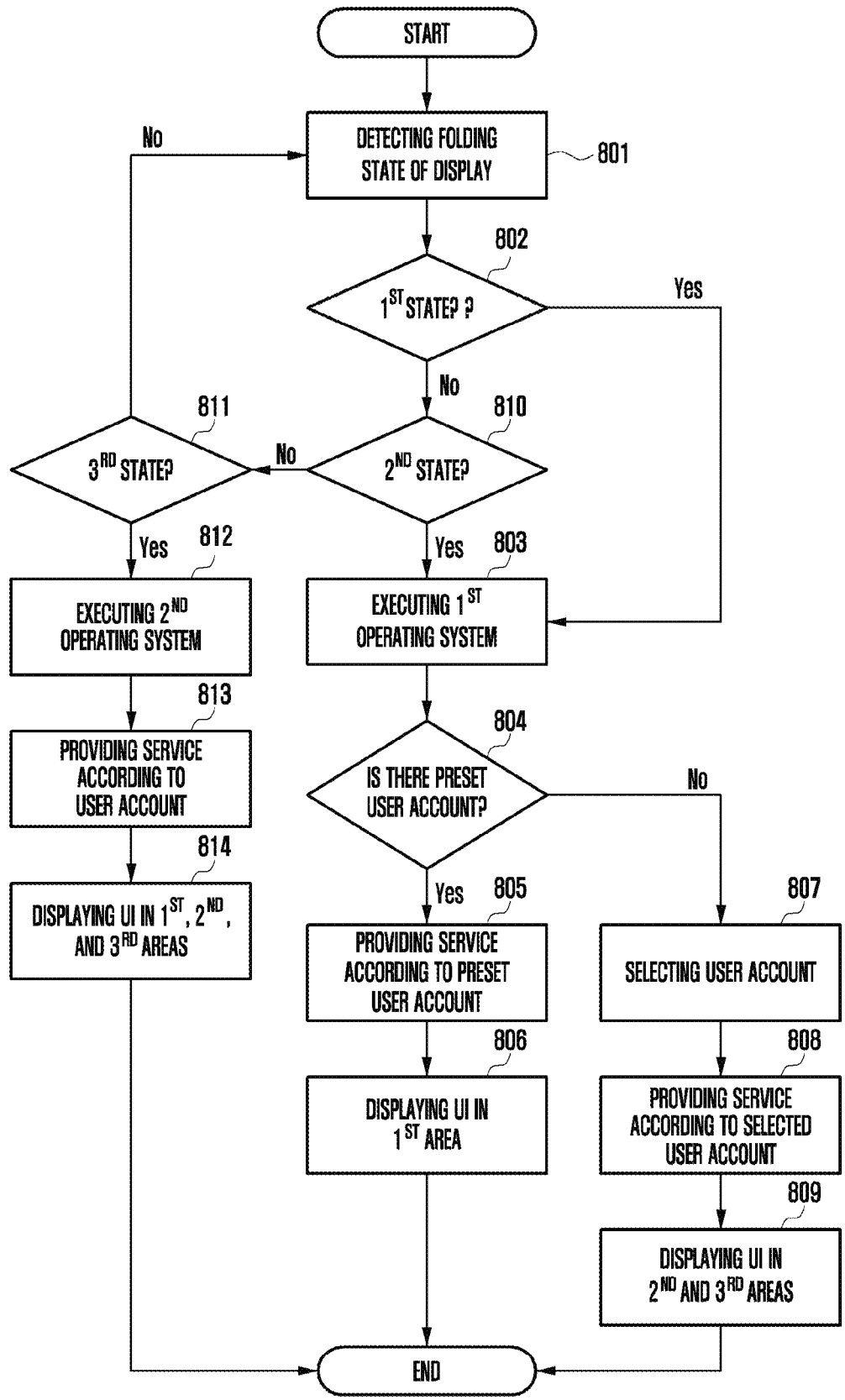
FIG. 8 is a flowchart illustrating an example method of using a display depending on a folding state according to various embodiments.

FIG. 8 is a flowchart illustrating an example method of using a display depending on the folding state according to various embodiments.

Referring to FIG. 8, a processor (e.g., the processor 120 in FIG. 1, the processor 210 in FIG. 2, or the processor 710 in FIG. 7) may detect the folding state of a display using a sensor (e.g., the sensor module 176 in FIG. 1, the sensor 220 in FIG. 2, or the sensor 720 in FIG. 7) (801). According to an embodiment, the processor may identify the folding state of the first display or the foldable display. The processor may identify whether the folding state of the display corresponds to the first state, the second state, or the third state (802, 810, and 811).

Referring to FIG. 8, when identifying that the folding state of the display (e.g., the display module 160 in FIG. 1, the first display 230 in FIG. 2, the first display 330 in FIG. 3A, the first display of FIG. 4B, the first display 520 in FIG. 5A, the first display 610 in FIG. 6A, or the first display 730 in FIG. 7) corresponds to the first state, the processor may select an operating system corresponding to the first state. According to an embodiment, the processor may select and execute the first operating system corresponding to the first state (803). In this case, the processor may display a user interface (UI) generated by the first operating system on the display area of the display. For example, the first operating system may correspond to an operating system for operating a smartphone or a tablet PC.

Referring to FIG. 8, when identifying that the folding state of the display corresponds to the second state, the processor may select an operating system corresponding to the second state. According to an embodiment, the processor may select and execute the first operating system corresponding to the second state (803). In this case, the processor may display a user interface generated by the first operating system on the display area of the display. For example, the first operating system may correspond to an operating system for operating a smartphone or a tablet PC.

Referring to FIG. 8, the processor may identify whether a preset user account using the first operating system exists (804). The preset account may be an account available in the first operating system. For example, in the first operating system, a first user account may be a personal account or a second user account may be a work account. According to an embodiment, the first user account may be a personal account for operating a smartphone, or the second user account may be a personal account for operating a tablet PC.

Referring to FIG. 8, the processor may provide a service according to a preset user account using the first operating system (805). For example, the processor may provide software, a communication service, or the like set and stored in the first user account of the first operating system.

Referring to FIG. 8, the processor may display a UI according to the preset user account on the first area (806). For example, the folding state of the display may correspond to the first state, and the UI for operating a smartphone may be displayed using the first operating system.

Referring to FIG. 8, the processor may provide a service according to the user account (808), which is selected through an input for selecting a user account for use of the first operating system in the first state or the second state (807). For example, when the folding state of the display corresponds to the second state, the UI for operating a tablet PC may be displayed in the second area and the third area using the first operating system (809).

Referring to FIG. 8, when identifying that the folding state of the display corresponds to the third state, the processor may select an operating system corresponding to the third state. According to an embodiment, the processor may select and execute the second operating system corresponding to the third state (812). In this case, the processor may display a user interface (UI) generated by the second operating system on the display area of the display. For example, the second operating system may correspond to an operating system for operating a PC.

Referring to FIG. 8, the processor may identify whether a preset user account using the second operating system exists. The preset account may be an account available in the second operating system. For example, in the second operating system, a third user account may be a personal account or a fourth user account may be a work account. According to an embodiment, the third user account may be a personal account for operating a PC, or the fourth user account may be a personal account for operating a PC.

Referring to FIG. 8, the processor may provide a service according to a preset user account or a selected user account using the second operating system (813). For example, the processor may provide software, a communication service, or the like set and stored in the third user account of the second operating system.

Referring to FIG. 8, the processor may display a UI according to the preset user account over the first area, the second area, and the third area (814). For example, the folding state of the display may correspond to the third state, and the UI for operating a PC may be displayed using the second operating system.

An electronic device according to various embodiments may have an operating system preset according to the folding state of the display. According to an embodiment, the preset operating system may correspond to an operating system capable of providing an optimized screen according to the folding state of the display or the area of the display. For example, an operating systems for operating a smart phone, an operating system for operating a tablet PC, and an operating system for operating a PC may be set to be executed in the order in which the display area increases from the smallest area. According to an embodiment, the execution of an operating system and the setting of a user account according to the folding state of the display may be customized by the user.

Figure 9A:
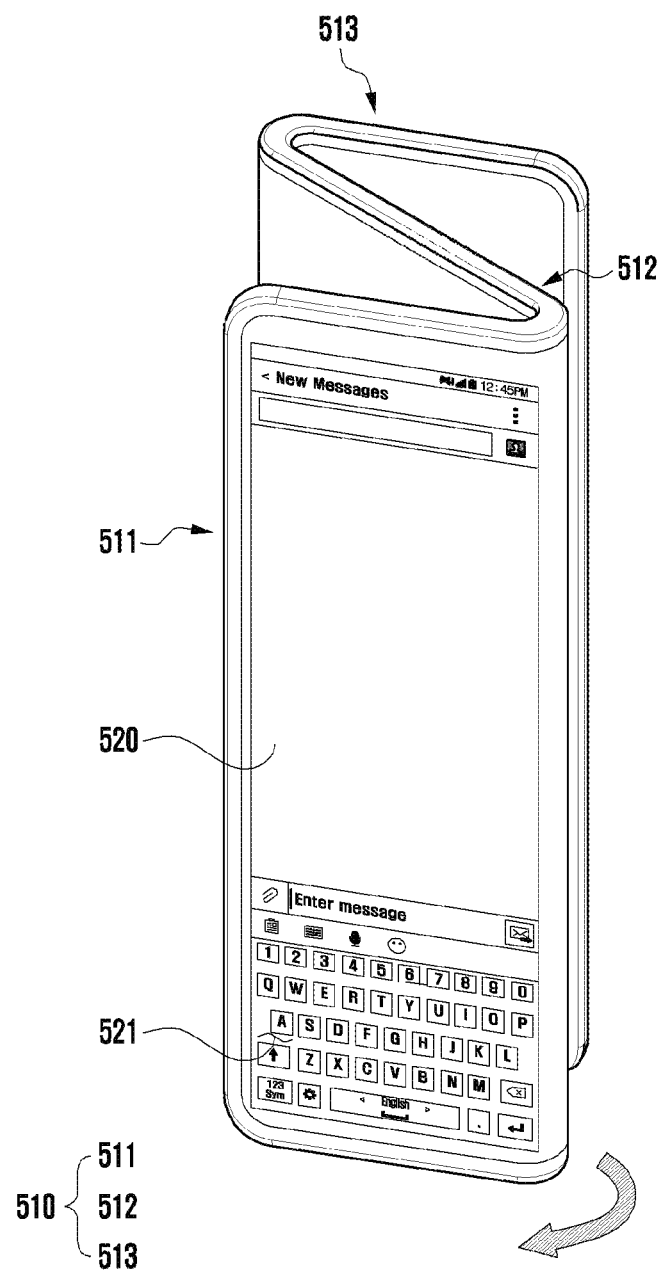
FIGS. 9A, 9B and 9C are perspective views each illustrating a task environment according to the folding state of a display of an electronic device according to various embodiments.
Figure 9B:
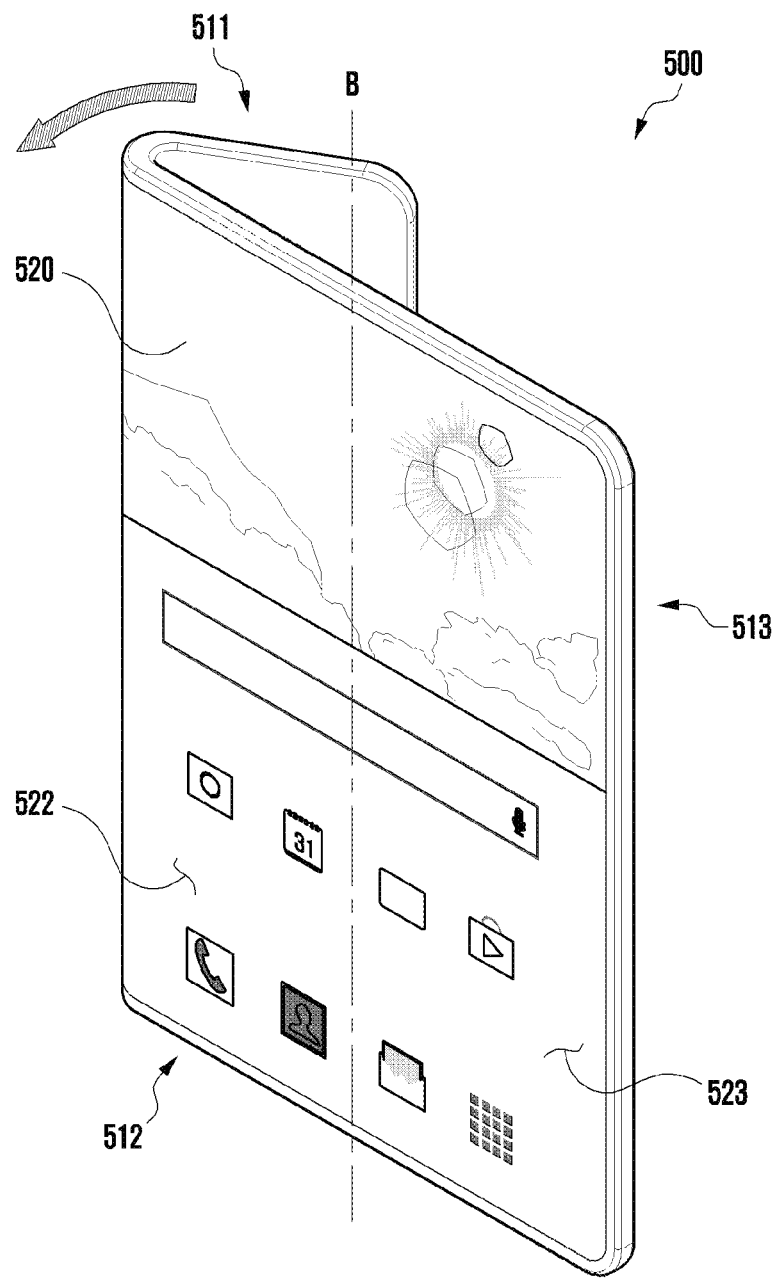
Figure 9C:
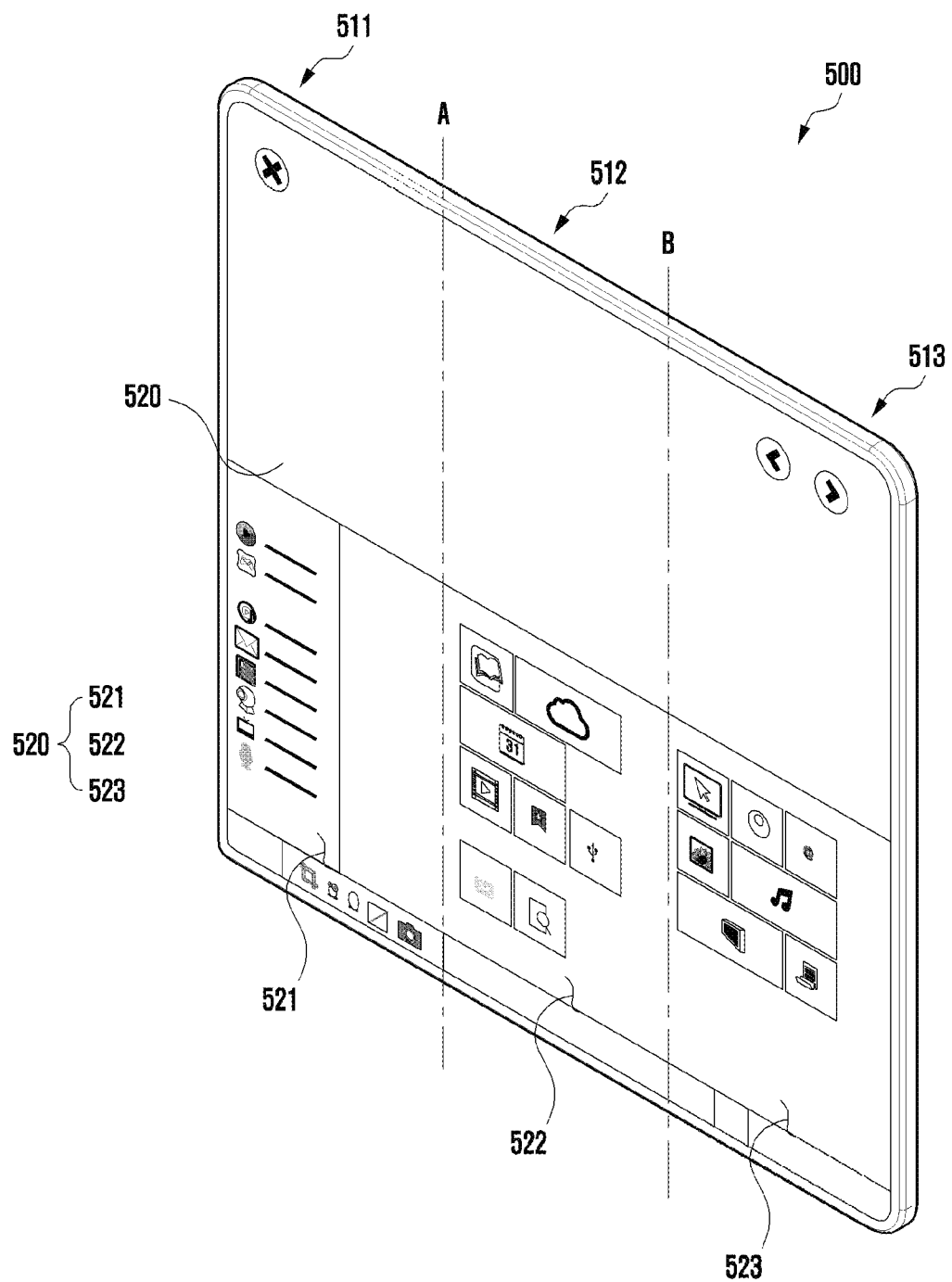

FIGS. 9A, 9B and 9C are perspective views each illustrating a task environment according to the folding state of a display of an electronic device according to various embodiments.

Referring to FIG. 9A, a processor (e.g., the processor 120 in FIG. 1, the processor 210 in FIG. 2, or the processor 710 in FIG. 7) may identify the folding state of the display detected through a sensor as a first state. For example, the first state may be a state in which the display is folded about both the axis A and the axis B, and may refer, for example, to a state in which the use area in the display is the smallest.

Referring to FIG. 9A, the first area 521 of the display 520 may display a UI generated by a first operating system for using the electronic device as a smartphone. According to an embodiment, there may be a plurality of user accounts for using the electronic device as a smartphone. An $N1_{th}$ user account of the smartphone may be a personal account or an $N2_{th}$ user account may be a work account.

Referring to FIG. 9B, the processor may identify the folding state of the display detected through a sensor (e.g., the sensor module 176 in FIG. 1, the sensor 220 in FIG. 2, or the sensor 720 in FIG. 7) and determine the state as a second state. For example, the second state may refer, for example, to a state in which the display is folded about the axis A and unfolded about the axis B. In this case, the electronic device may be in the first state as well as in the second state. For example, the second area 522 and the third area 523 of the display may be used, or only the first area 521 may be used. When the electronic device is flipped in the figure of FIG. 9B, the first area 521 may be used, which may correspond to the first state in which the smallest area of the display is used.

Referring to FIG. 9B, the second area 522 and the third area 523 of a display 520 (e.g., the display module 160 in FIG. 1, the first display 230 in FIG. 2, the first display 330 in FIG. 3A, the first display 420 in FIG. 4B, the first display 520 in FIG. 5A, the first display 610 in FIG. 6A, or the first display 730 in FIG. 7) may display a UI generated by the first operating system for use as a tablet PC. According to an embodiment, there may be a plurality of user accounts for using the electronic device as a tablet PC. An $N3_{th}$ user account of the tablet PC may be a personal account or an $N4_{th}$ user account may be a work account.

Referring to FIG. 9C, the processor may identify the folding state of the display detected through the sensor and determine the state as a third state. For example, the third state may refer, for example, to a state in which the display is unfolded about both the axis A and the axis B, and may refer, for example, to a state in which the use area in the display is widest.

Referring to FIG. 9C, the first area 521, the second area 522, and the third area 523 of the display 520 may display a UI generated by the second operating system for use as a PC. According to an embodiment, there may be a plurality of user accounts for using the electronic device as a PC. An $N5_{th}$ user account of the PC may be a personal account or an $N6_{th}$ user account may be a work account.

Figure 10A:
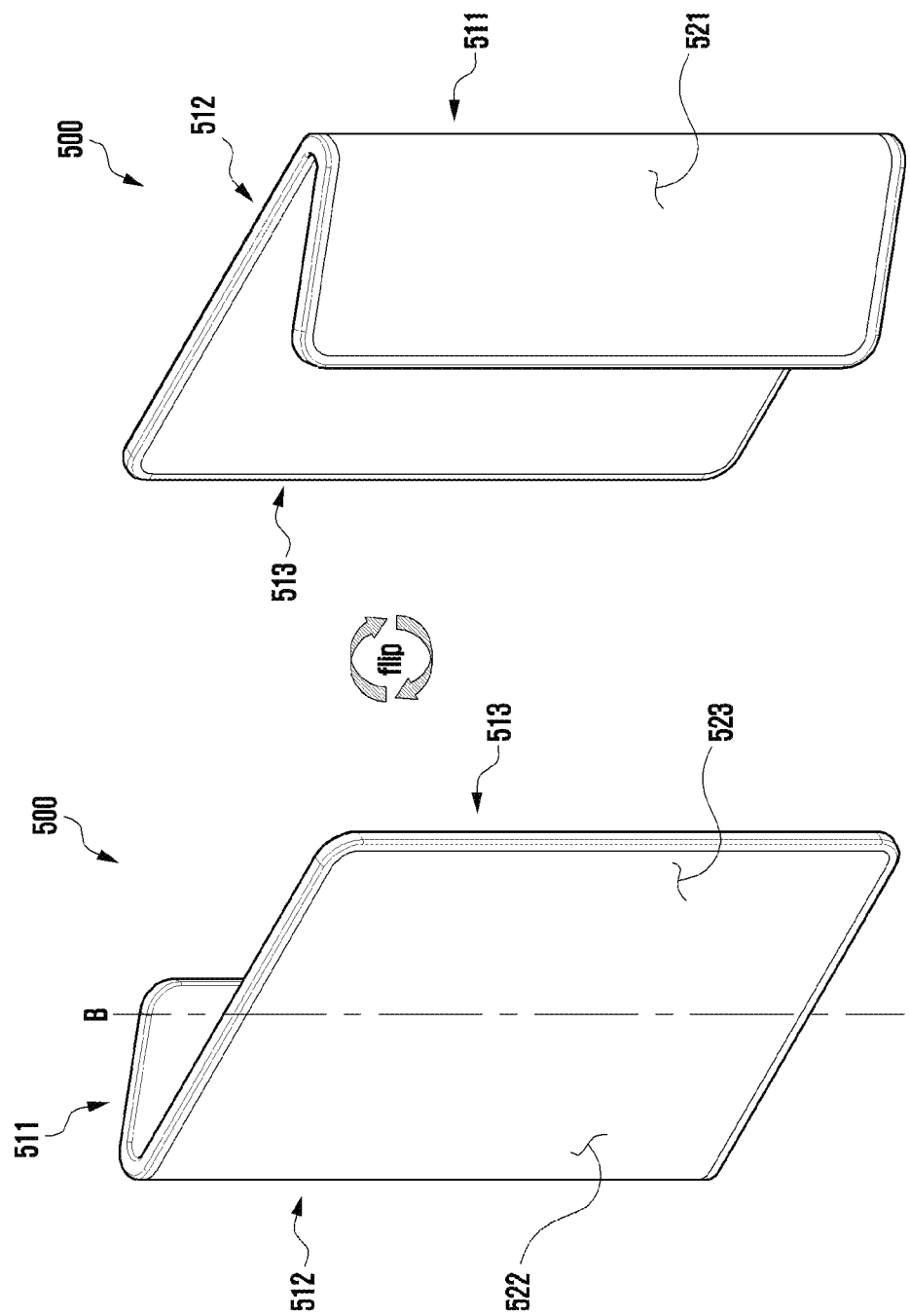
FIG. 10A is a perspective view of a display of an electronic device in a folding state according to various embodiments.

FIG. 10A is an perspective view of the folding state of a display of an electronic device according to various embodiments.

Referring to FIG. 10A, a processor (e.g., the processor 120 in FIG. 1, the processor 210 in FIG. 2, the processor 710 in FIG. 7) may identify the folding state of the display (e.g., the display module 160 in FIG. 1, the first display 230 in FIG. 2, the first display 330 in FIG. 3A, the first display 420 in FIG. 4B, the first display 520 in FIG. 5A, the first display 610 in FIG. 6A, or the first display 730 in FIG. 7) detected through a sensor and may determine the state as a second state. For example, the second state may refer, for example, to a state in which the display is folded about the axis A and unfolded about the axis B. In this case, the electronic device may be in the first state as well as in the second state. For example, the second area 522 and the third area 523 of the display may be used, or only the first area 521 may be used. When the electronic device is flipped in the figure of FIG.

10A, the first area 521 may be used, which may correspond to the first state in which the smallest area of the display is used.

According to an embodiment, a user may flip an electronic device (e.g., the electronic device 101 in FIG. 1, the electronic device 200 in FIG. 2, the electronic device 300 in FIG. 3A, the electronic device 400 in FIG. 4A, the electronic device 500 in FIG. 5A, the electronic device 600 in FIG. 6A, or the electronic device 700 in FIG. 7) during the use of the electronic device in the second state, and may use the electronic device in the first state. In this case, the processor may display a UI for use as a smartphone in the first state on the first area 521. According to an embodiment, for a user's continuous experience, the content (e.g., a service), which is being used in the second state, may be continuously provided even in the first state obtained through the flipping. In this case, even when the flipping is performed while a service is being provided under a user account of the tablet PC using the first operating system (e.g., the second state), the processor may provide a service for using the electronic device as a smartphone (e.g., the first state) under the same user account. Account setting and use mode (e.g., smartphone, tablet PC, PC, etc.) setting for continuity or discontinuity of user experience may be customized by the user.

Figure 10B:
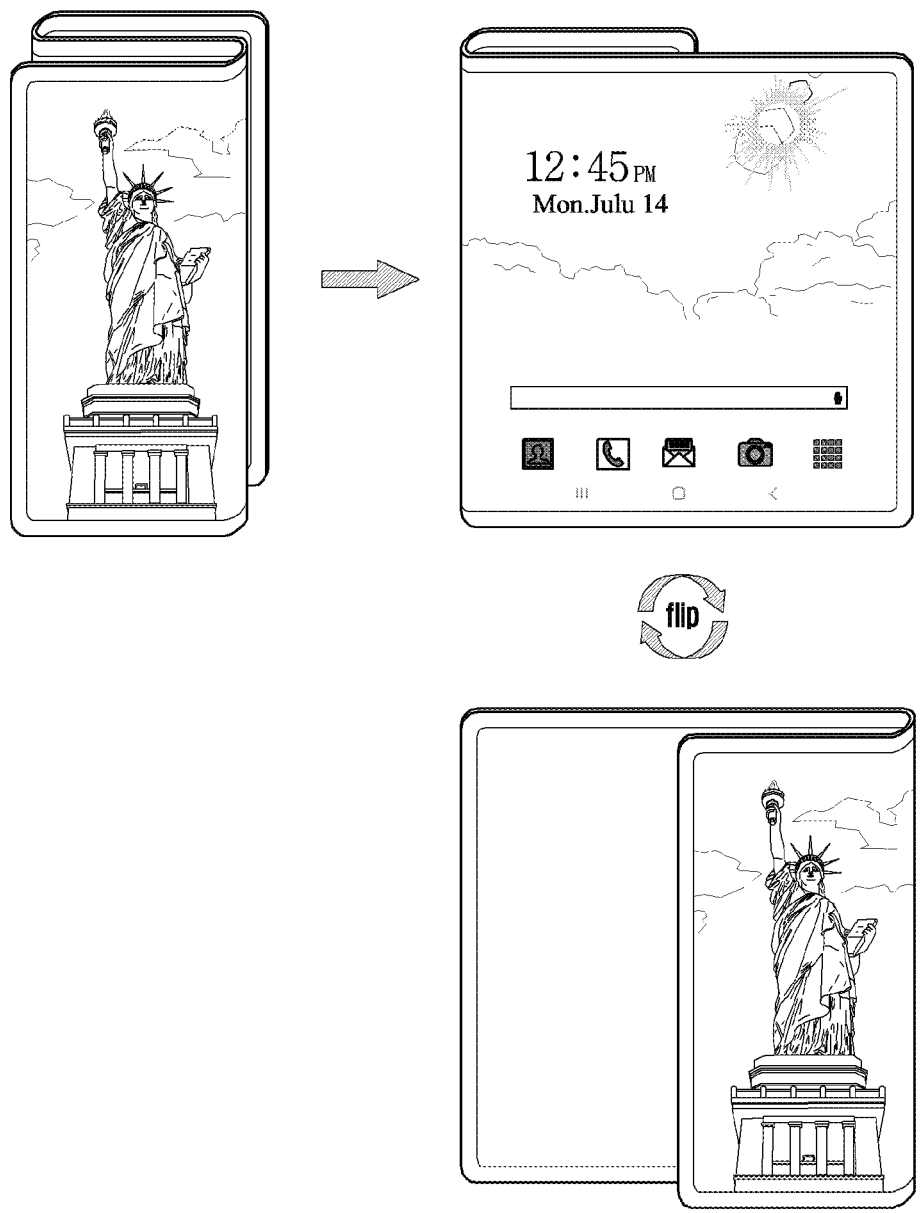
FIG. 10B is diagram illustrating a change in a task environment of an electronic device according to various embodiments.

FIG. 10B is an diagram illustrating a change in a task environment of an electronic device according to various embodiments.

Referring to FIG. 10B, a display (e.g., the display module 160 in FIG. 1, the first display 230 in FIG. 2, the first display 330 in FIG. 3A, the first display 420 in FIG. 4B, the first display 520 in FIG. 5A, the first display 610 in FIG. 6A, or the first display 730 of FIG. 7) may be classified into an $n_{th}$ state depending on the use area in the display according to the folding state thereof.

The smallest display area use state of an electronic device (e.g., the electronic device 101 in FIG. 1, the electronic device 200 in FIG. 2, the electronic device 300 in FIG. 3A, the electronic device 400 in FIG. 4A, the electronic device 500 of FIG. 5A, the electronic device 600 in FIG. 6A, or the electronic device 700 in FIG. 7) may be regarded as a first state. A state in which the display is unfolded about one of two folding axes may be regarded as a second state. For example, in order to change the electronic device to the second state from the first state during the use of the electronic device and to use the electronic device in the second state, the user may use the electronic device in the state in which the electronic device is folded about one folding axis and unfolded state about the other folding axis.

According to an embodiment, a user who is using the electronic device as a tablet PC in the second state may flip the electronic device and use the electronic device as a smartphone in the first state. According to an embodiment, the user may use the electronic device in the first state by flipping the electronic device while the electronic device is being used in the second state. At this time, the processor (e.g., the processor 120 in FIG. 1, the processor 210 in FIG. 2, or the processor 710 in FIG. 7) may display, in the first area, a UI for use as a smartphone in the first state. According to an embodiment, for a user's continuous experience, the content (e.g., a service), which is being used in the second state, may be continuously provided even in the first state obtained through the flipping. In this case, even when the flipping is performed while a service is being provided under a user account of the tablet PC using the first operating system (e.g., the second state), the processor may provide a service for using the electronic device as a smartphone (e.g., the first state) under the same user account. Account setting and use mode (e.g., smartphone, tablet PC, PC, etc.) setting for continuity or discontinuity of user experience may be customized by the user.

FIGS. 11A, 11B, 11C and 11D are diagrams each illustrating providing content at the time of a change of the folding state of a display of an electronic device according to various embodiments.

Referring to FIGS. 11A, 11B, 11C and 11D (which may be referred to as FIGS. 11A to 11D), in an electronic device (e.g., the electronic device 101 in FIG. 1, the electronic device 200 in FIG. 2, the electronic device 300 in FIG. 3A, the electronic device 400 in FIG. 4A, the electronic device 500 in FIG. 5A, the electronic device 600 in FIG. 6A, or the electronic device 700 in FIG. 7), the display may be folded or unfolded about two or more folding axes. For example, the electronic device may be used in a first state, a second state, or a third state in the order in which the use area in the display increases.

In addition, in the order in which the use area in the display (e.g., the display module 160 in FIG. 1, the first display 230 in FIG. 2, the first display 330 in FIG. 3A, the first display 420 in FIG. 4B, the first display 520 in FIG. 5A, the first display 610 in FIG. 6A, or the first display 730 in FIG. 7) increases, the electronic device may be used as a smartphone, a tablet PC, or a PC.

According to various embodiments, the electronic device may be changed from the first state (1110) to the second state (1120) by being unfolded about one folding axis. In this case, in the first state and the second state, the same first operating system may be used, or different operating systems may be used. For example, in the case of using the same first operating system, the content, which is being used in the first state, may be copied/pasted as it is in the second state, and vice versa. In this case, a portion of the content may be copied (1141) and stored in a clipboard (1142) in the first state, and may be pasted (1143) in the second state. According to an embodiment, even if the first operating system is used in the first state and the second operating system is used in the second state, it may be possible to copy/paste the content by sharing the clipboard.

Figure 11A:
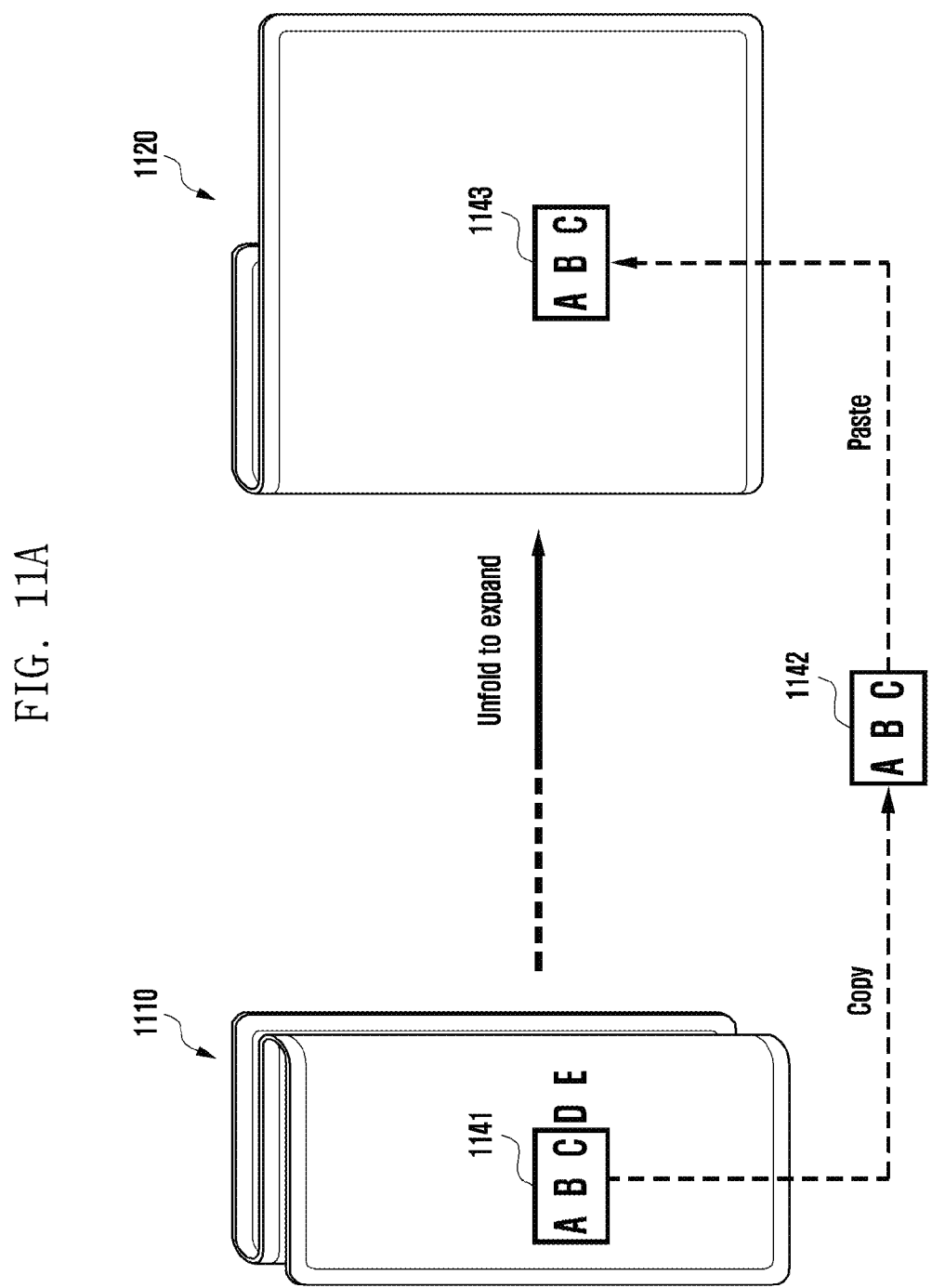
Figure 11B:
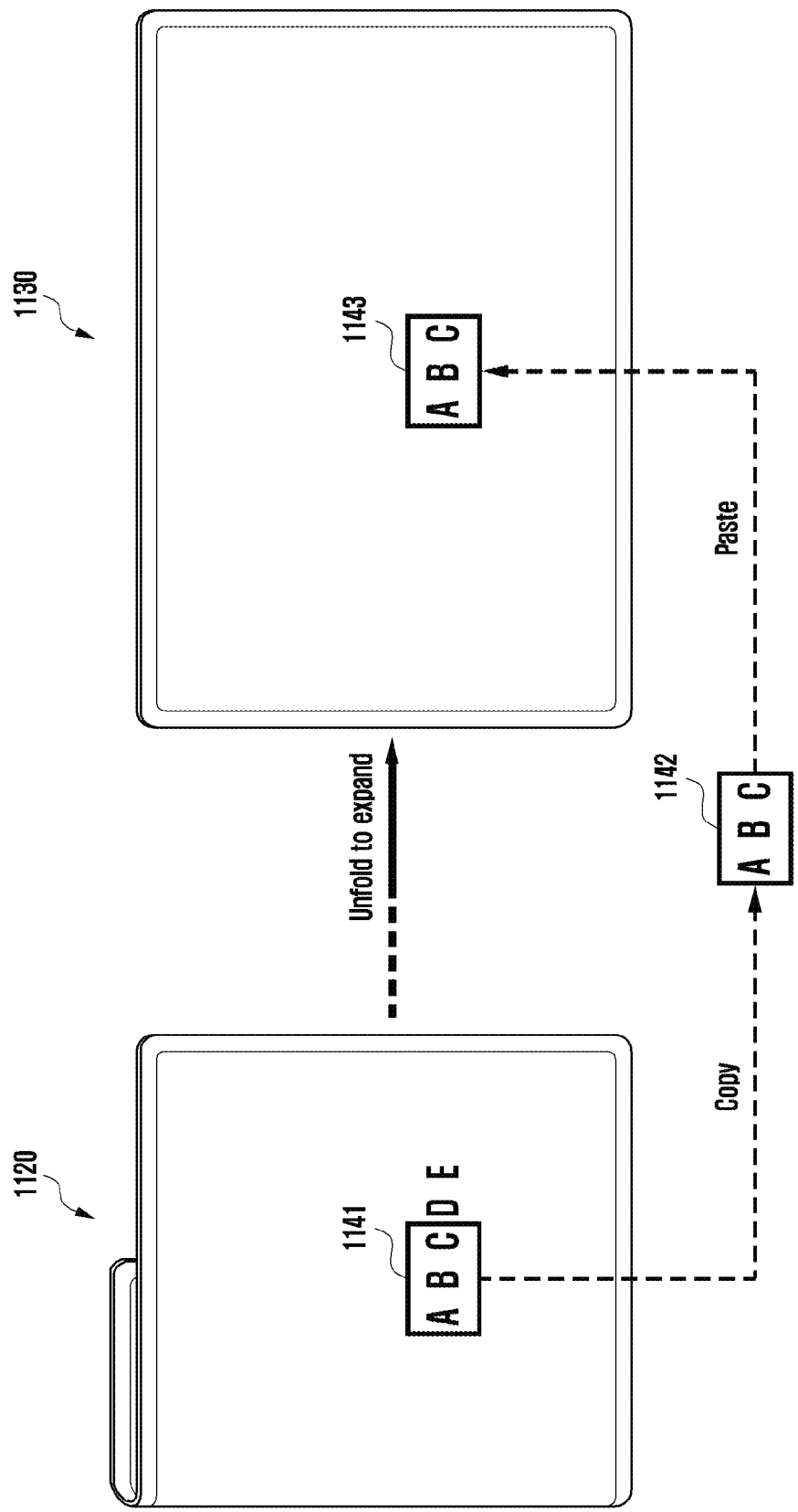

Referring to FIG. 11B, the electronic device may be changed from the second state (1120) to the third state (1130) in which the electronic device is unfolded about two folding axes. In this case, in the second state and the third state, the same first operating system may be used, or different operating systems may be used. For example, in the case of using the same first operating system, the content, which is being used in the second state, may be copied/pasted as it is in the third state, and vice versa. In this case, a portion of the content may be copied (1141) and stored in the clipboard (1142) in the second state, and may be pasted (1143) in the third state. According to an embodiment, even if the first operating system is used in the second state and the second operating system is used in the third state, it may be possible to copy/paste the content by sharing the clipboard.

Referring to FIG. 11C, the electronic device may be changed from the first state (1110) to the third state (1130) in which the electronic device is unfolded about two folding axes. In this case, in the first state and the third state, the same first operating system may be used, or different operating systems may be used. For example, in the case of using the same first operating system, the content, which is being used in the third state, may be copied/pasted as it is in the third state, and vice versa. In this case, a portion of the content may be copied (1141) and stored in the clipboard (1142) in the first state, and may be pasted (1143) in the third state. According to an embodiment, even if the first operating system is used in the first state and the second operating system is used in the third state, it may be possible to copy/paste the content by sharing the clipboard.

Referring to FIG. 11D, the electronic device may be changed from the second state (1120) to the first state (1111). The second state may be, for example, a state in which the display is unfolded about one of the two folding axes. When the electronic device is flipped during the use thereof in the second state, the electronic device may be used in the first state in which the smallest area is used. In this case, the first state used after being flipped may be referred to as a modified first state or the like, and there is no limitation. In the second state (1120) and the flipped first state (1111), the same first operating system may be used, or different operating systems may be used. For example, in the case of using the same first operating system, the content, which is being used in the second state, may be copied/pasted as it is in the first state (1111), and vice versa. In this case, a portion of the content may be copied (1141) and stored in a clipboard (1142) in the first state (1111), and may be pasted (1143) in the second state. According to an embodiment, even if the first operating system is used in the second state and the second operating system is used in the first state, it may be possible to copy/paste the content by sharing the clipboard.

Figure 12A:
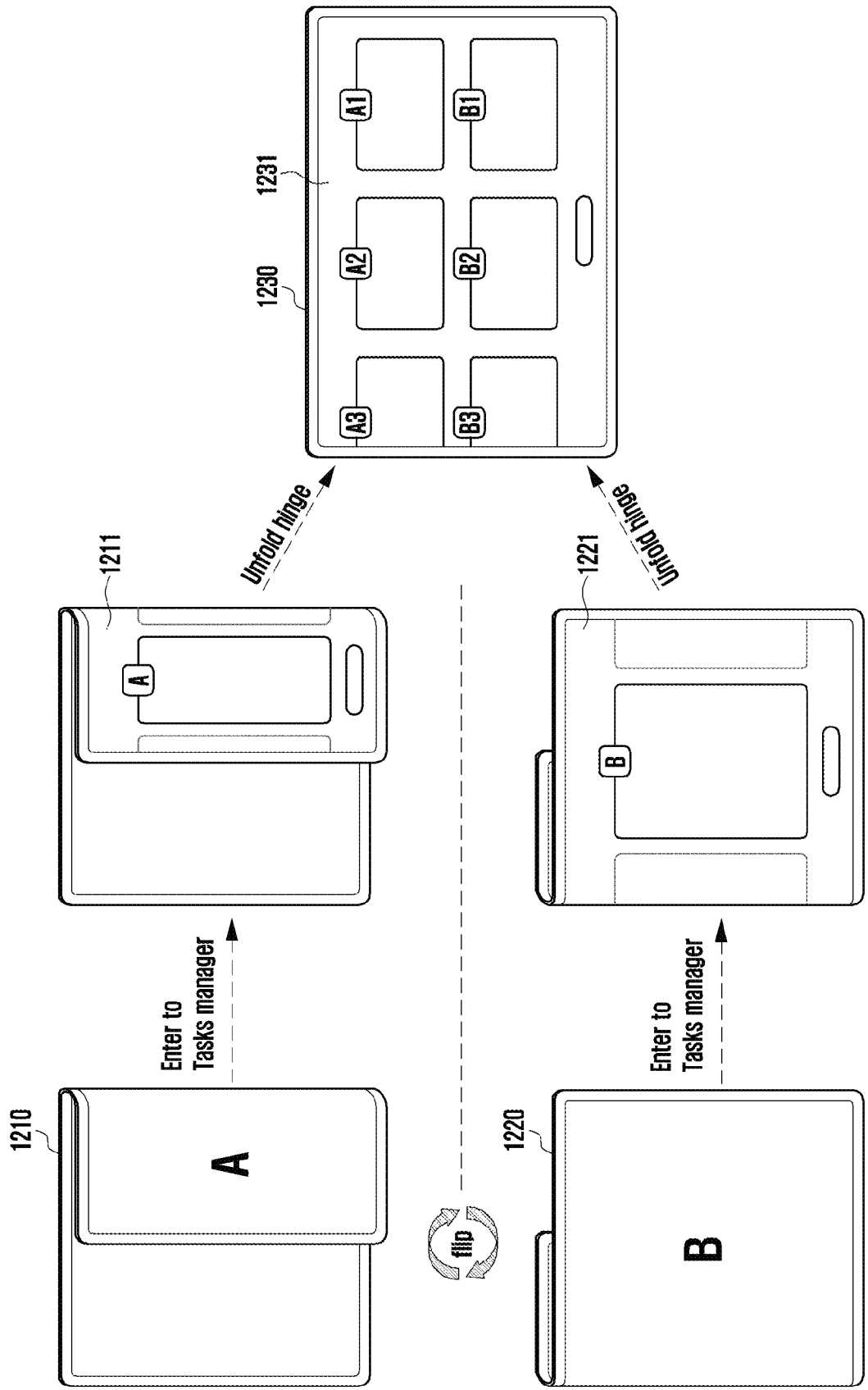
FIGS. 12A, 12B and 12C are diagrams each illustrating execution of an integrated task manager of an electronic device according to various embodiments.
Figure 12B:
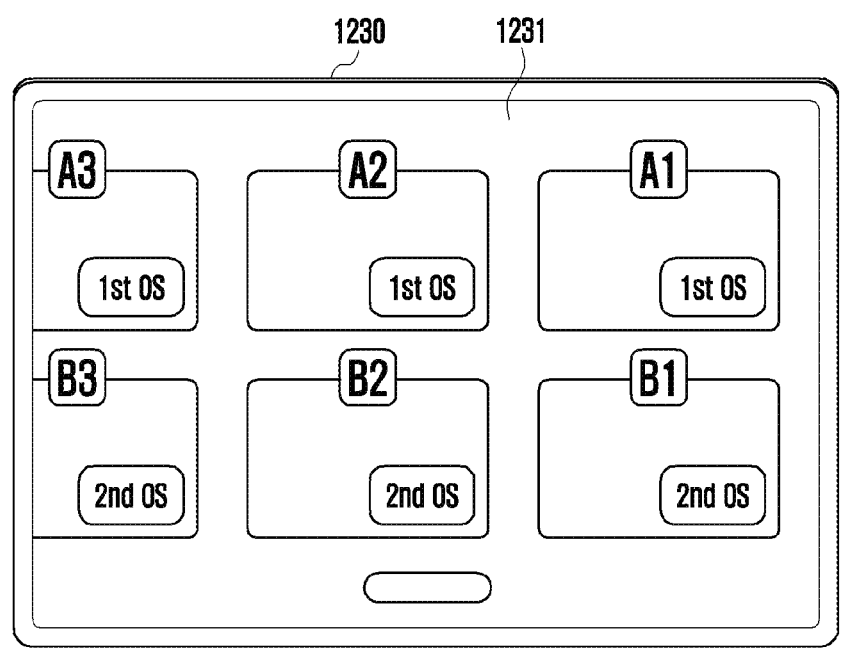
Figure 12C:
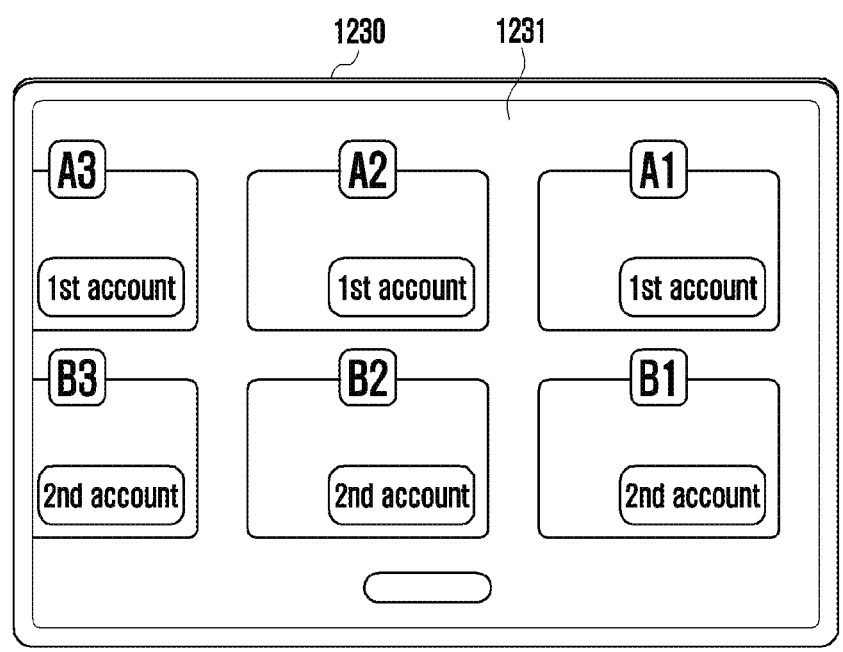

FIGS. 12A, 12B and 12C are diagrams each illustrating execution of an integrated task manager of an electronic device according to various embodiments.

The state (1210) of FIG. 12A may be a first state in which an electronic device (e.g., the electronic device 101 in FIG. 1, the electronic device 200 in FIG. 2, the electronic device 300 in FIG. 3A, the electronic device 400 in FIG. 4A, the electronic device 500 in FIG. 5A, the electronic device 600 in FIG. 6A, and the electronic device 700 in FIG. 7) may be used. For example, the state (1220) may be a second state, the electronic device may be flipped to be used in the first state, and in this case, the electronic device may be in the first state (1210). When the electronic device is used in the first state by being flipped during the use in the second state, it may be referred to as a flipped first state or the like.

Referring to FIG. 12A, the user of the electronic device may manage the services which are being used by executing a task manager 1211 in the flipped first state. According to an embodiment, the user may manage the services which are being used by executing the task manager 1221 in the second state (1220). In this way, the user may independently execute and independently manage task managers according to individual operating systems and/or individual user accounts in the individual states (e.g., the first state, the second state, the third state, etc.).

According to an embodiment, the flipped first state (1210) may be changed to the third state (1230) or the second state (1220) may be changed to the third state (1230). The user may execute the task manager in the third state (1230) to manage the services which are being used. Referring to FIG. 12A, the user may manage the services which are used in the first state and the second state by executing the task manager (1231) in the third state (1230). In this way, the integrated task manager may be executed, and although not illustrated, the services in the third state may be managed together, or only the services in the third state may be managed. According to an embodiment, the user may independently execute and independently manage task managers according to individual operating systems and/or individual user accounts in the individual states (e.g., the first state, the second state, the third state, etc.). In addition, services according to individual operating systems and/or individual user accounts may be integrated and managed in individual states via the integrated task manager.

Referring to FIG. 12B, the services which are used in the first state and the second state may be managed by executing the integrated task manager (1231) in the third state. For example, when the first operating system is used in the first state and the second operating system is used in the second state, it may be distinguished by separately indicating an individual operating system that is used for executing each state, as illustrated in FIG. 12B. According to an embodiment, the services, which are used in the third state, may also be managed together using the integrated task manager. A separate display may be displayed together in the task manager according to the operating system in the third state. According to an embodiment, when the task manager is executed in the third state, only the management of the service, which is being used in the third state, may be possible. For example, only the service in the third state may be managed by independent task manager execution in the third state.

Referring to FIG. 12C, the services which is used in the first state and the second state may be managed by executing the integrated task manager (1231) in the third state. For example, when a first user account is used in the first state and a second user account is used in the second state, it may be distinguished by separately indicating an individual account that is used for executing each state, as illustrated in FIG. 12C. According to an embodiment, the services, which are used in the third state, may also be managed together using the integrated task manager. A separate display may be displayed together in the task manager according to a third user account in the third state. According to an embodiment, when the task manager is executed in the third state, only the management of the service, which is being used in the third state, may be possible. For example, only the service in the third state may be managed by independent task manager execution in the third state.

Figure 13A:
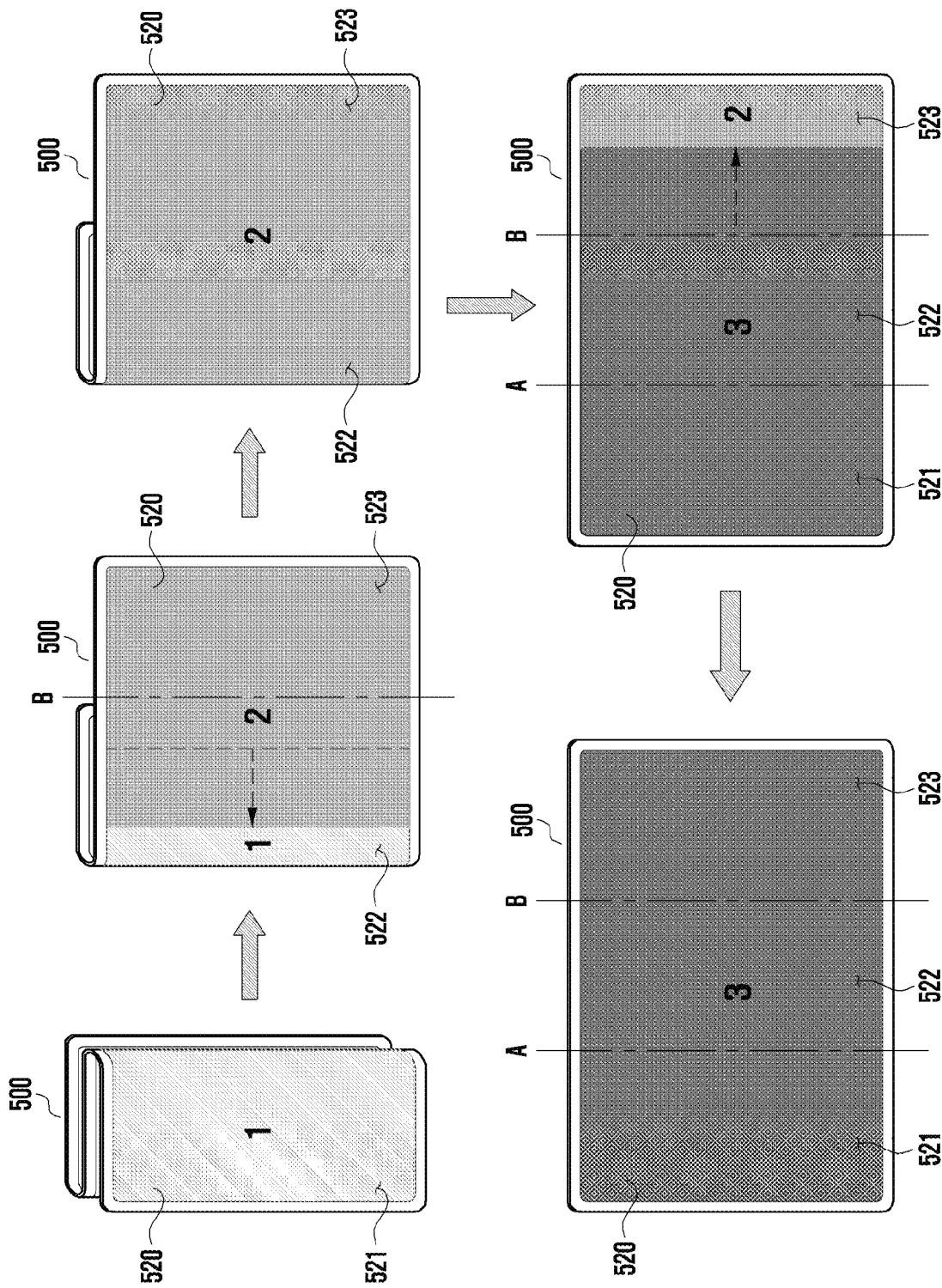

FIGS. 13A and 13B are diagrams each illustrating a UI change due to a change of the folding state of a display of an electronic device according to various embodiments.

Referring to FIG. 13A, in an electronic device (e.g., the electronic device 101 in FIG. 1, the electronic device 200 in FIG. 2, the electronic device 300 in FIG. 3A, the electronic device 400 in FIG. 4A, the electronic device 500 in FIG. 5A, the electronic device 600 in FIG. 6A, or the electronic device 700 in FIG. 7), the display may be folded or unfolded about two or more folding axes. For example, the electronic device may be used in a first state, a second state, or a third state in the order in which the use area in the display increases. In addition, the electronic device may be used as a smartphone, a tablet PC, or a PC in the order in which the use area in the display increases.

Referring to the numbers displayed on the display (e.g., the display module 160 in FIG. 1, the first display 230 in FIG. 2, the first display 330 in FIG. 3A, the first display 420 in FIG. 4B, the first display 520 in FIG. 5A, the first display 610 in FIG. 6A, or the first display 730 in FIG. 7) of the electronic device illustrated in FIG. 13A, the number "1" displayed in the first area in the first state 1 may refer, for example, to a display area used in the first state. The number "2" may refer, for example, to a display use area in the second state, and the number "3" may refer, for example, to a display use area in the third state. However, the numbers displayed on the display do not correspond to individual states one-to-one, and may refer, for example, to the displayed area or the changed display area according to the change of the display use environments (e.g., the first state, the second state, the third state, etc.).

Referring to FIG. 13A, when the folding state of the display is the first state, the UI may be displayed on the first area. When the display is unfolded about the axis A, the UI, which has been displayed in the first area, is displayed in the second area and the third area while the display is changed from the first state to the second state, or a UI according to a new operating system and/or a new user account may be displayed. In this case, in the unfolding process, UI(1), which has been previously displayed in the first state, may be expressed with an area-decreasing animation effect in the second state. For example, UI(1), which has been displayed in the first area, may coexist with UI(2) to be displayed in the second area and the third area. While UI(2) to be displayed in the second state is increased in area, the UI(1), which has been displayed in the first state, may be implemented with an area-decreasing animation effect.

According to an embodiment, the user may input a touch event for selecting UI(2) of which the area is being increased or UI(1) of which the area is being decreased. A UI, of which the area is selected by the user from the two UI areas while the animation effect is occurring, may be finally displayed in the second state. Referring to FIG. 13A, when the user does not input a touch event while the animation effect is occurring, UI(2) of which the area is being increased may be displayed in the entire area (e.g., the area spanning over the second area and the third area) in the second state. According to an embodiment, the user may input a touch event for selecting UI(1) of which the area is being decreased. In this case, unlike that illustrated in FIG. 13A, UI(1) of which the area is being decreased be finally displayed in the second state.

Referring to FIG. 13A, when the folding state of the display is the second state, the UI may be displayed over the second area and the third area. In the case of unfolding about the axis B, while the display is changed from the second state to the third state, the UI, which has been displayed over the second area and the third area, is displayed over the first area, the second area, and the third area or a UI according to a new operating system and/or a new user account may be displayed. In this case, in the unfolding process, UI(2), which has been previously displayed in the second state, may be expressed with an area-decreasing animation effect in the third state. For example, UI(2), which has been displayed over the second area and the third area, may coexist with UI(3) to be displayed over the first area, the second area, and the third area. While the area of UI(3) to be displayed in the third state is increased in area, the UI(2), which has been displayed in the first state, may be implemented with an area-decreasing animation effect.

According to an embodiment, the user may input a touch event for selecting UI(3) of which the area is being increased or UI(2) of which the area is being decreased. A UI, of which the area is selected by the user from the two UI areas while the animation effect is occurring, may be finally displayed in the third state. Referring to FIG. 13A, when the user does not input a touch event while the animation effect is occurring, UI(3) of which the area is being increased may be displayed in the entire area (e.g., the area spanning over the first to third areas) in the third state. According to an embodiment, the user may input a touch event for selecting UI(2) of which the area is being decreased. In this case, unlike that illustrated in FIG. 13A, UI(2) of which the area is being decreased be finally displayed in the third state.

FIG. 13B may illustrate that an electronic device is used in a first state or a second state. For example, the electronic device may be used in the first state (1310) in a state in which all of a plurality of folding axes are folded. The state (1320) may be the second state in which the display is unfolded about one folding axis, and may be used in the first state by flipping the electronic device. When the electronic device is used in the first state by being flipped during the use in the second state, it may be referred to as a flipped first state or the like.

Referring to FIG. 13B, depending on the folding state of the display of the electronic device, the electronic device may be used as a smartphone in the first state or as a tablet in the second state. When the folding state of the display is the first state, the UI may be displayed on the first area. When the display is unfolded about the axis A, the UI, which has been displayed in the first area, is displayed in the second area and the third area while the display is changed from the first state to the second state, or a UI according to a new operating system and/or a new user account may be displayed. In this case, in the unfolding process, a UI (e.g., a UI for using a smartphone), which has been previously displayed in the first state, may be expressed with an area-decreasing animation effect in the second state (1320). For example, the UI, which has been displayed in the first area, may coexist with a UI (e.g., a UI for using a tablet PC) to be displayed in the second area and the third area. While the UI to be displayed in the second state is increased in area, the UI, which has been displayed in the first state, may be implemented with an area-decreasing animation effect.

According to an embodiment, the user may input a touch event for selecting a UI of which the area is being increased or a UI of which the area is being decreased. A UI, of which the area is selected by the user from the two UI areas while the animation effect is occurring, may be finally displayed in the second state. Referring to FIG. 13B, when the user does not input a touch event while the animation effect is occurring, the UI of which the area is being increased may be displayed in the entire area (e.g., the area spanning over the second area and the third area) in the second state (1330). According to an embodiment, the user may input a touch event for selecting the UI of which the area is being decreased. In this case, the UI of which the area is being decreased may be finally displayed 1340 in the entire area (e.g., the area spanning over the second area and the third area) in the second state.

An electronic device according to various example embodiments of the disclosure may include: a first display configured to be foldable about at least one axis; a sensor configured to detect a folding state of the first display; and a processor operatively connected to the first display and the sensor, wherein the processor may be configured to: detect the folding state of the first display using the sensor; determine a display area of the first display based on the folding state of the first display; select an operating system (OS) corresponding to the folding state of the first display; and display a user interface (UI) generated by the operating system as a display area of the first display.

According to various example embodiments of the disclosure, the processor of the electronic device may be configured to be connected to a service provided by the operating system using a user account corresponding to the folding state of the first display.

According to various example embodiments of the present disclosure, the processor of the electronic device may be configured, in response to a change in the folding state of the first display, to provide an operating system corresponding to an unfolded state with content generated by an operating system corresponding to the folded state.

According to various example embodiments of the disclosure, the processor of the electronic device may be configured to integrate and manage execution services on the operating system corresponding to the folding state of the first display based on executing a task manager.

According to various example embodiments of the disclosure, the processor of the electronic device may be configured to: in response to a change of the folding state of the first display from the folded state to the unfolded state, decrease a display area of a UI generated by an operating system corresponding to the folded state of the first display, and display a display area of a UI generated by an operating system corresponding to the unfolded state on the first display while increasing the display area of the UI; and based on a specified event being detected, display, on the first display, in the unfolded state one of the UI generated by the operating system corresponding to the folded state or the UI generated by the operating system corresponding to the unfolded state.

In the electronic device according to various example embodiments of the disclosure, the specified event may include a touch event that selects a UI, of which a display area is decreased or a touch event that selects a UI, of which a display area is increased, and the processor may be configured to: upon detecting the touch event for the UI, of which the display area is decreased, display the UI generated by the operating system corresponding to the folded state, on the first display in the unfolded state; and upon detecting the touch event for the UI, of which the display area is increased, display the UI generated by the operating system corresponding to the unfolded state, on the first display in the unfolded state.

An electronic device according to various example embodiments of the disclosure may include: a first display configured to be foldable about at least one axis; a sensor configured to detect the folding state of the first display; a first housing including a first surface and a second surface located in a direction opposite to the first surface; a second housing including a third surface and a fourth surface located in a direction opposite to the third surface; and a hinge to which the first housing and the second housing are connected; a second display provided on the second surface of the first housing or the fourth surface of the second housing; and a processor operatively connected to the first display, the second display, and the sensor, wherein the first display may be provided over the first surface of the first housing and the third surface of the second housing, and based on the first display being folded, a first area and a second area, which are divided with reference to the axis, may face each other.

According to various example embodiments of the disclosure, the processor of the electronic device may be configured to be connected to a service provided by the operating system using a user account corresponding to the folding state of the first display.

According to various example embodiments of the disclosure, the processor of the electronic device may be configured to: in a state in which the first display is folded, provide the second display with a UI, which is generated by a first operating system, using the first operating system; and in a state in which the first display is unfolded, provide the first display with a UI, which is generated by a second operating system, using the second operating system. The processor may be configured to provide the second operating system with content, which is generated by the first operating system, in response to the change in the folding state of the first display. The processor may be configured to integrate and manage execution services on the operating system corresponding to the folding state of the first display when executing a task manager. The processor may be configured to: in response to a change of the folding state of the first display from the folded state to the unfolded state, decrease a display area of a UI generated by the first operating system, and display a display area of a UI generated by the second operating system on the first display while increasing the display area of the UI; and based on a specified event being detected, display one selected from the UI generated by first the operating system or the UI generated by the second operating system, on the first display in the unfolded state. The preset event may include a touch event that selects a UL, of which a display area is decreased or a touch event that selects a UI, of which a display area is increased, and the processor may be configured to: upon detecting the touch event for the UI, of which the display area is decreased, display the UI, which is generated by the first operating system, on the first display in the unfolded state; and upon detecting the touch event for the UI, of which the display area is increased, display the UI, which is generated by the second operating system, on the first display in the unfolded state.

An electronic device according to various example embodiments of the disclosure may include: a first display configured to be foldable about at least one axis; a sensor configured to detect the folding state of the first display; a first housing including a first surface and a second surface located in a direction opposite to the first surface; a second housing including a third surface and a fourth surface located in a direction opposite to the third surface; and a hinge to which the first housing and the second housing are connected; and a processor operatively connected to the first display and the sensor, wherein the first display may be provided over the first surface of the first housing and the third surface of the second housing, and based on the first display being folded, a first area and a second area, which are divided with reference to the axis, may face away from each other.

According to various example embodiments of the disclosure, the processor of the electronic device may be configured to: in a state in which the first display is folded, provide the first area of the first display with a UI, which is generated by a first operating system, using the first operating system; and in a state in which the first display is unfolded, provide the first display with a UI, which is generated by a second operating system, using the second operating system.

An electronic device according to various example embodiments of the disclosure may include: a first display configured to be foldable about at least one axis; a sensor configured to detect the folding state of the first display; a first housing including a first surface and a second surface located in a direction opposite to the first surface; a second housing including a third surface and a fourth surface located in a direction opposite to the third surface; a third housing including a fifth surface and a sixth surface located in a direction opposite to the fifth surface; a first hinge to which the first housing and the second housing are connected; a second hinge to which the second housing and the third housing are connected; and a processor operatively connected to the first display and the sensor, wherein the first display may be provided over the first surface of the first housing, the third surface of the second housing, and the fifth surface of the third housing, the at least one axis may include a first axis forming a folding axis of the first hinge and a second axis forming a folding axis of the second hinge, and based on the first display being folded, a first area and a second area, which are divided with reference to the first axis, may face away from each other, and the second area and a third area, which are divided with reference to the second axis, may face each other.

According to various example embodiments of the disclosure, the processor of the electronic device may be configured to be connected to a service provided by the operating system using a user account corresponding to the folding state of the first display. The processor may be configured to: in a state in which the first display is folded about the first axis and the second axis, provide the first area with a UI, which is generated by the first operating system, using the first operating system; in a state in which the display is unfolded about the second axis while being folded about the first axis, provide the second area and the third area with the UI, which is generated by the first operating system, using the first operating system; and in a state in which the display is unfolded about the first axis and the second axis, provide the display with a UI, which is generated by the second operating system, using the second operating system. The processor may be configured to provide the second operating system with content, which is generated by the first operating system, in response to the change in the folding state of the first display. The processor may be configured to: store, in a clip board, and provide the content, which is generated by the first operating system, and content, which is generated by the second operating system, in response to the change in the folding state of the first display. The processor may be configured to: store, in a clip board, a first document copied in the state in which the first display is folded about the first axis and the second axis, and provide the second operating system with the first document using the clip board based on the first display being changed to the state in which the first display is unfolded about the first axis and the second axis; and store, in the clip board, a second document copied in the state in which the first display is unfolded about the first axis and the second axis, and provide the first operating system with the second document using the clipboard based on the first display being changed to a state in which the first display is folded about at least one of the first axis and the second axis. The processor may be configured to integrate and manage execution services on the operating system corresponding to the folding state of the first display when executing a task manager. The processor may be configured to: in response to a change of the display from the state of being folded about the first axis and the second axis to the state of being unfolded about the second axis, decrease the display area of a UI, which is generated under a first user account of the first operating system, and display a display area of a UI, which is generated under a second user account of the first operating system, in the second area and the third area while increasing the display area of the UI; and based on a specified event being detected, display, in the second area and the third area, one selected from the UI generated under the first user account of the first operating system or the UI generated under the second user account of the first operating system. The processor may be configured to: in response to a change of the display from the state of being unfolded about the second axis and while being folded about the first axis to the state of being unfolded about the first axis and the second axis, decrease the display area of a UI, which is generated under a first user account or a second user account of the first operating system, and display a display area of a UI, which is generated under a third user account of the second operating system, on the display while increasing the display area of the UI; and based on a specified event being detected, display, on the display, one selected from the UI generated under the first user account or the second user account of the first operating system or the UI generated under the third user account of the second operating system. The specified event may include a touch event that selects a UI, of which a display area is decreased or a touch event that selects a UI, of which a display area is increased, and the processor may be configured to: upon detecting the touch event for the UI, of which the display area is decreased, display the UI, which is generated by the first operating system, in the second area and the third area, or on the display; and upon detecting the touch event for the UI, of which the display area is increased, display the UI, which is generated by the first operating system, or the UI, which is generated by the second operating system, in the second area and the third area, or on the display.

The electronic device according to various embodiments of the disclosure may further include a gyro sensor, wherein the gyro sensor may be configured to detect flipping of the electronic device, and the processor may be configured to, in a state in which the display is unfolded about the second axis while being folded about the first axis, connect a service provided by the first operating system using a first user account via the first area based on flipping being detected by the gyro sensor while the service provided by the first operating system is being connected using a second user account of the first operating system.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first display configured to be foldable about at least one axis;
a sensor configured to detect a folding state of the first display; and
at least one processor comprising processing circuitry and operatively connected to the first display and the sensor,
wherein the at least one processor, individually and/or collectively, is configured to:
detect the folding state of the first display using the sensor;
determine a display area of the first display based on the folding state of the first display;
based on detecting a first state of the first display, select a first operating system, from among a plurality of operating systems, corresponding to the first state of the first display, display a user interface (UI) generated by the first operating system in the display area of the first display, and provide a service according to a first user account preset for the first operating system from among a plurality of user accounts using the first operating system; and
in response to detecting a change of the folding state of the first display from the first state to a second state of the first display, select a second operating system, different from the first operating system, from among the plurality of operating systems corresponding to the second state of the first display, display a UI generated by the second operating system in the display area of the first display, and provide a service according to a second user account preset for the second operating system from among the plurality of user accounts using the second operating system.

2. The electronic device of claim 1, wherein the first user account is a personal account and the second user account is a work account.

3. The electronic device of claim 1, wherein the at least one processor is configured to integrate and manage execution services on the operating system corresponding to the folding state of the first display in case of executing a task manager.

4. The electronic device of claim 1, wherein the first state corresponds to a state in which the first display is folded and the second state corresponds to a state in which the first display is unfolded and the at least one processor is configured to:
in response to a change of the folding state of the first display from the first state to the second state, decrease a display area of the UI generated by the first operating system corresponding to the first state of the first display, and display a display area of the UI generated by the second operating system corresponding to the second state on the first display while increasing the display area of the UI generated by the second operating system; and
in case that a specified event is detected in the unfolded state, display one of the UI, which is generated by the operating system corresponding to the first state, or the UI, which is generated by the operating system corresponding to the second state, on the first display in the unfolded state.

5. The electronic device of claim 4, wherein the specified event comprises a touch event that selects a UI, of which a display area is decreased or a touch event that selects a UI, of which a display area is increased, and
wherein the at least one processor is configured to:
upon detecting the touch event for the UI, of which the display area is decreased, display the UI, which is generated by the first operating system, on the first display in the unfolded state; and
upon detecting the touch event for the UI, of which the display area is increased, display the UI, which is generated by the second operating system, on the first display in the unfolded state.

6. The electronic device of claim 1, further comprising:
a first housing comprising a first surface and a second surface located in a direction opposite to the first surface;
a second housing comprising a third surface and a fourth surface located in a direction opposite to the third surface;
a hinge to which the first housing and the second housing are connected; and
a second display provided on the second surface of the first housing or the fourth surface of the second housing,
wherein the first display is provided over the first surface of the first housing and the third surface of the second housing, and
in case that the first display is folded, a first area and a second area, which are divided with reference to the axis, face each other.

7. The electronic device of claim 6, wherein the first state corresponds to a sate in which the first display is folded and the second state corresponds to a state in which the first display is unfolded, and the at least one processor is configured to:
in a state in which the first display is folded, provide the second display with the UI, which is generated by the first operating system, using the first operating system; and
in a state in which the first display is unfolded, provide the first display with the UI, which is generated by the second operating system, using the second operating system.

8. The electronic device of claim 1, further comprising:
a first housing comprising a first surface and a second surface located in a direction opposite to the first surface;
a second housing comprising a third surface and a fourth surface located in a direction opposite to the third surface; and
a hinge to which the first housing and the second housing are connected,
wherein the first display is provided over the first surface of the first housing and the third surface of the second housing, and
in case that the first display is folded, a first area and a second area, which are divided with reference to the axis, face away from each other.

9. The electronic device of claim 1, further comprising:
a first housing comprising a first surface and a second surface located in a direction opposite to the first surface;
a second housing comprising a third surface and a fourth surface located in a direction opposite to the third surface; and
a third housing comprising a fifth surface and a sixth surface located in a direction opposite to the fifth surface;
a first hinge to which the first housing and the second housing are connected; and
a second hinge to which the second housing and the third housing are connected,
wherein the first display is provided over the first surface of the first housing, the third surface of the second housing, and the fifth surface of the third housing,
the at least one axis comprises a first axis forming a folding axis of the first hinge and a second axis forming a folding axis of the second hinge, and
in case that the first display is folded, a first area and a second area, which are divided with reference to the first axis, face away from each other, and a second area and a third area, which are divided with reference to the second axis, face each other.

10. An electronic device comprising:
a display configured to be foldable about at least one axis;
a sensor configured to detect a folding state of the display;
a first housing comprising a first surface and a second surface located in a direction opposite to the first surface:
a second housing comprising a third surface and a fourth surface located in a direction opposite to the third surface; and
a third housing comprising a fifth surface and a sixth surface located in a direction opposite to the fifth surface;
a first hinge to which the first housing and the second housing are connected:
a second hinge to which the second housing and the third housing are connected,
wherein the display is provided over the first surface of the first housing, the third surface of the second housing, and the fifth surface of the third housing,
the at least one axis comprises a first axis forming a folding axis of the first hinge and a second axis forming a folding axis of the second hinge, and
in case that the display is folded, a first area and a second area, which are divided with reference to the first axis, face away from each other, and a second area and a third area, which are divided with reference to the second axis, face each other; and
at least one processor comprising processing circuitry and operatively connected to the display and the sensor, wherein the at least one processor, individually and/or collectively, is configured to:
detect the folding state of the display using the sensor;
determine a display area of the display based on the folding state of the display;
select an operating system, from among a plurality of operating systems, corresponding to the folding state of the display;
in a state in which the display is folded about the first axis and the second axis, select a first operating system from among the plurality of operating systems and provide the first area with a user interface (UI), which is generated by the first operating system, using the first operating system;
in a state in which the display is unfolded about the second axis while being folded about the first axis, select the first operating system from among the plurality of operating systems and provide the second area and the third area with the UI, which is generated by the first operating system, using the first operating system; and in a state in which the display is unfolded about the first axis and the second axis, select a second operating system, different from the first operating system, from among the plurality of operating systems and provide the display with a UI, which is generated by the second operating system, using the second operating system.

11. The electronic device of claim 10, wherein the at least one processor is configured to provide the second operating system with content, which is generated by the first operating system, in response to the change in the folding state of the display.

12. The electronic device of claim 11, wherein the at least one processor is configured to store, in a clipboard, and provide the content, which is generated by the first operating system, and content, which is generated by the second operating system, in response to the change in the folding state of the display.

13. The electronic device of claim 11, wherein the at least one processor is configured to:

store, in a clipboard, a first document copied in the state in which the display is folded about the first axis and the second axis, and provide the second operating system with the first document using the clipboard in case that the display is changed to the state in which the display is unfolded about the first axis and the second axis; and store, in the clipboard, a second document copied in the state in which the display is unfolded about the first axis and the second axis, and provide the first operating system with the second document using the clipboard in case that the display is changed to a state in which the display is folded about at least one of the first axis and the second axis.

14. The electronic device of claim 10, wherein the at least one processor is configured to:

in response to a change of the display from the state of being folded about the first axis and the second axis to the state of being unfolded about the second axis, decrease a display area of a UI, which is generated under a first user account of the first operating system, and display a display area of a UI, which is generated under a second user account of the first operating system, on the second area and the third area while increasing the display area of the UI; and in case that a specified event is detected, display, in the second area and the third area, a UI selected from the UI generated under the first user account of the first operating system or the UI generated under the second user account of the first operating system.

15. The electronic device of claim 10, further comprising a gyro sensor configured to detect flipping of the electronic device, and wherein the at least one processor is configured to, in a state in which the display is unfolded about the second axis while being folded about the first axis and detecting flipping of the electronic device by the gyro sensor while a service provided by the first operating system is being connected using a second user account of the first operating system, connect a service provided by the first operating system using a first user account via the first area.

16. The electronic device of claim 10, wherein the at least one processor is configured to:

in a state in which the display is folded about the first axis and the second axis, provide a service according to a first user account preset for the first operating system from among a plurality of user accounts using the first operating system;

in a state in which the display is unfolded about the second axis while being folded about the first axis, provide a service according to a first user account preset for the first operating system from among a plurality of user accounts using the first operating system; and in a state in which the display is unfolded about the first axis and the second axis, provide a service according to a second user account preset for the second operating system from among the plurality of user accounts using the second operating system.

* * * * *